(12) United States Patent
Itoga et al.

(10) Patent No.: US 7,760,221 B2
(45) Date of Patent: Jul. 20, 2010

(54) OPTICAL DISK IMAGE DRAWING METHOD

(75) Inventors: Hisanori Itoga, Hamamatsu (JP); Tatsuo Fushiki, Hamamatsu (JP); Seiya Yamada, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 0 days.

(21) Appl. No.: 11/768,292

(22) Filed: Jun. 26, 2007

(65) Prior Publication Data

US 2008/0002015 A1    Jan. 3, 2008

(30) Foreign Application Priority Data

May 13, 2010    (JP) .............................. 2006-175860

(51) Int. Cl.
B41J 2/435    (2006.01)
(52) U.S. Cl. ..................................... 347/224
(58) Field of Classification Search ................. 347/224; 369/94
See application file for complete search history.

(56) References Cited

U.S. PATENT DOCUMENTS

| | | | |
|---|---|---|---|
| 2004/0186954 A1* | 9/2004 | Gotoh | 711/112 |
| 2005/0265158 A1 | 12/2005 | Minamimoto et al. | |
| 2005/0266413 A1 | 12/2005 | Shivji et al. | |
| 2006/0028967 A1* | 2/2006 | Tsukihashi et al. | 369/272.1 |

FOREIGN PATENT DOCUMENTS

| | | |
|---|---|---|
| EP | 1 742 219 A2 | 1/2007 |
| JP | 2002-203321 A | 7/2002 |
| JP | 2004-5847 A | 1/2004 |
| JP | 2004-5848 A | 1/2004 |
| JP | 2005-346886 A | 12/2005 |

OTHER PUBLICATIONS

Extended European Search Report dated Oct. 1, 2007 (Six (6) pages).

* cited by examiner

*Primary Examiner*—Matthew Luu
*Assistant Examiner*—Kendrick X Liu
(74) *Attorney, Agent, or Firm*—Crowell & Moring LLP

(57) ABSTRACT

An optical disk image drawing method includes: rotating the optical disk by a spindle motor; reading a predetermined information recorded on a track of a data recording layer; detecting a predetermined position on the track based on the read predetermined information; measuring a position of the spindle motor in a rotating direction using the detected predetermined position as a reference position; changing a focus position of the laser beam to the image drawing layer; starting forming the visible image on the image drawing layer from a predetermined position of the spindle motor in the rotating direction relative to the reference position based on the measured position of the spindle motor in the rotating direction; and sequentially moving an optical pick-up in the radial direction synchronously with the rotation of the spindle motor to proceed to form the visible image.

6 Claims, 24 Drawing Sheets

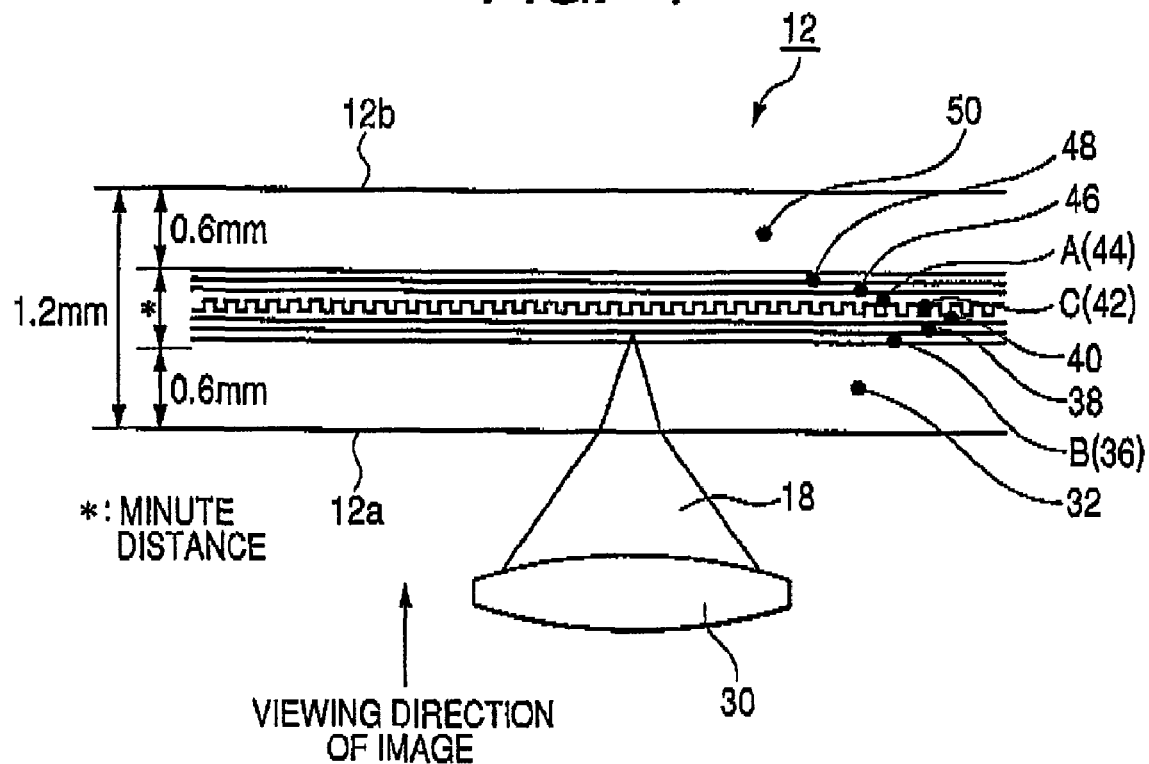
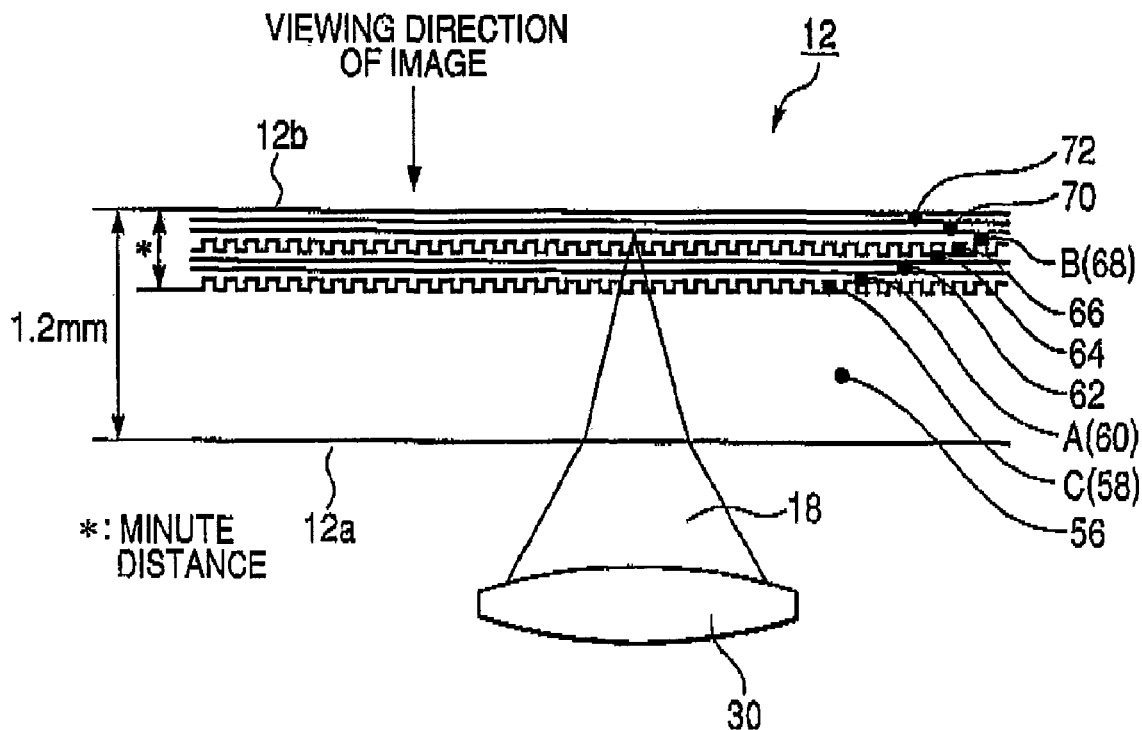

FIG. 13
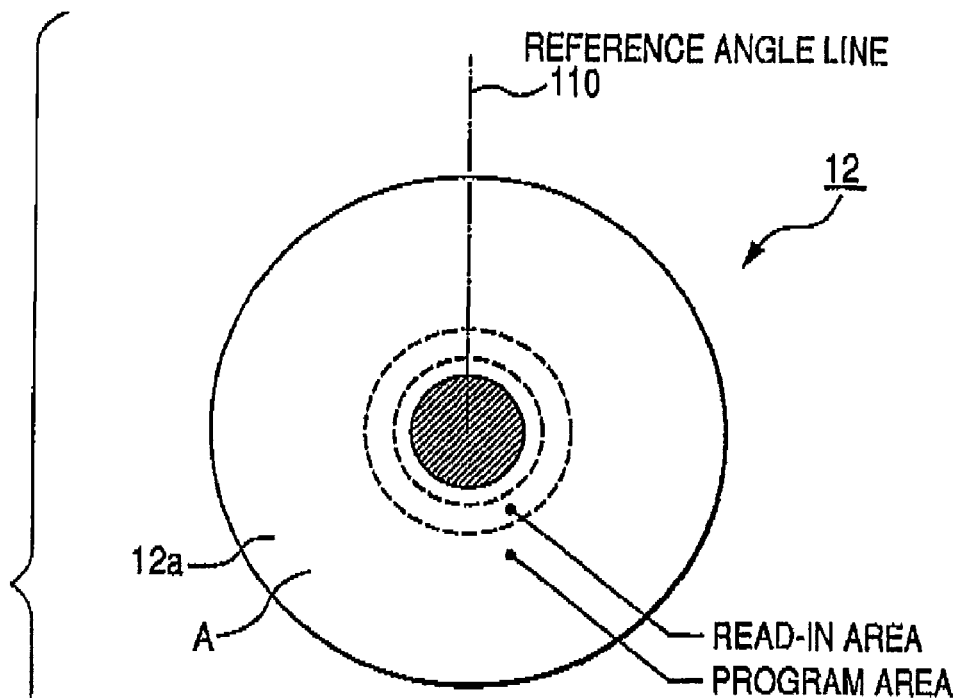
(a) DATA RECORDING LAYER A VIEWED FROM LASER INCIDENT SURFACE
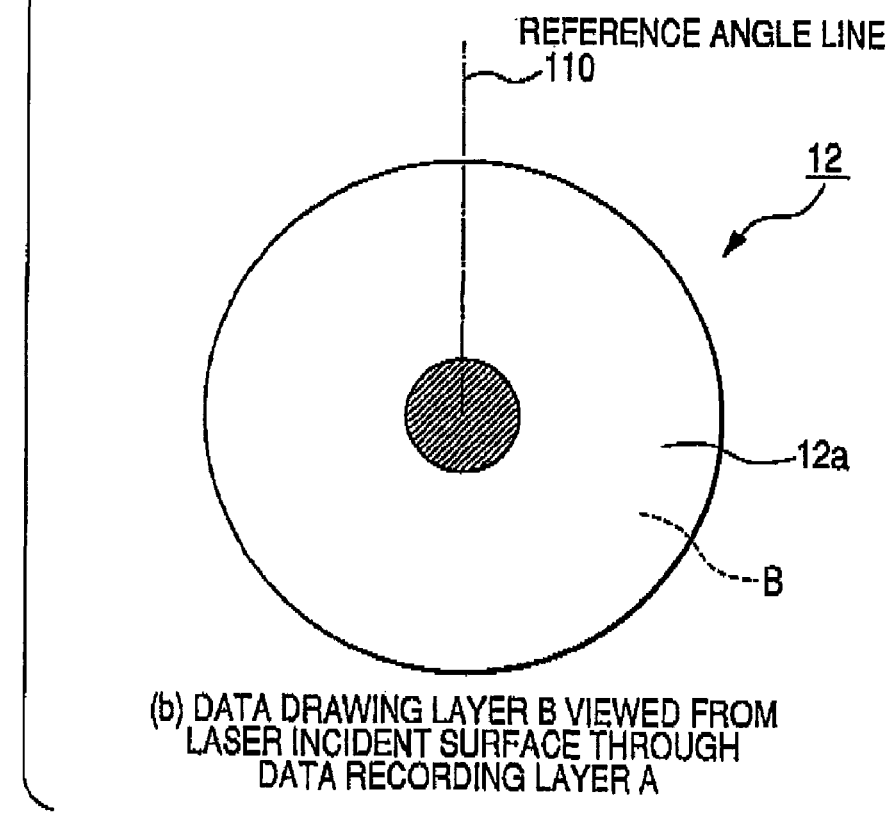
(b) DATA DRAWING LAYER B VIEWED FROM LASER INCIDENT SURFACE THROUGH DATA RECORDING LAYER A

U1=0 : disc for restricted use
    U2..U7=000000    : General Purpose disc
    U2..U7=others     : Identification Code for Special Purpose discs.
                                  Reserved for the encoding of Special Disc Applications.

U1=1
    U2..U7=000000    : Disc for unrestricted use
    U2..U7=others     : Reserved

FIG. 25

| Symbol | R | S | T | U | V | W |
|---|---|---|---|---|---|---|
| 0 | MODE ||| ITEM |||
| 1 | INSTRUCTION ||||||
| 2 | PARITY Q0 ||||||
| 3 | PARITY Q1 ||||||
| 4 | DATA field ||||||
| 5 | ||||||
| 6 | ||||||
| 7 | ||||||
| 8 | ||||||
| 9 | ||||||
| 10 | ||||||
| 11 | ||||||
| 12 | ||||||
| 13 | ||||||
| 14 | ||||||
| 15 | ||||||
| 16 | ||||||
| 17 | ||||||
| 18 | ||||||
| 19 | ||||||
| 20 | PARITY P0 ||||||
| 21 | PARITY P1 ||||||
| 22 | PARITY P2 ||||||
| 23 | PARITY P3 ||||||

| Symbol | R | S | T | U | V | W |
|---|---|---|---|---|---|---|
| 4 | 0 | 1 | 0 | 1 | 0 | 1 |
| 5 | 1 | 0 | 1 | 0 | 1 | 0 |
| 6 | 0 | 1 | 0 | 1 | 0 | 1 |
| 7 | 1 | 0 | 1 | 0 | 1 | 0 |
| 8 | 0 | 1 | 0 | 1 | 0 | 1 |
| 9 | 1 | 0 | 1 | 0 | 1 | 0 |
| 10 | 0 | 1 | 0 | 1 | 0 | 1 |
| 11 | 1 | 0 | 1 | 0 | 1 | 0 |
| 12 | 0 | 1 | 0 | 1 | 0 | 1 |
| 13 | 1 | 0 | 1 | 0 | 1 | 0 |
| 14 | 0 | 1 | 0 | 1 | 0 | 1 |
| 15 | 1 | 0 | 1 | 0 | 1 | 0 |
| 16 | 0 | 1 | 0 | 1 | 0 | 1 |
| 17 | 1 | 0 | 1 | 0 | 1 | 0 |
| 18 | 0 | 1 | 0 | 1 | 0 | 1 |
| 19 | 1 | 0 | 1 | 0 | 1 | 0 |

FIG. 28

| FRAME NUMBER | DATA NUMBER | | | | | | | | | |
|---|---|---|---|---|---|---|---|---|---|---|
| | 1 | 2 | 3 | 4 | 5 | 6 | 7 | ... | 23 | 24 |
| 1 | 0x00 | 0x01 | 0x02 | 0x03 | 0x04 | 0x05 | 0x06 | ... | 0x16 | 0x17 |
| 2 | 0x00 | 0x01 | 0x02 | 0x03 | 0x04 | 0x05 | 0x06 | ... | 0x16 | 0x17 |
| 3 | 0x00 | 0x01 | 0x02 | 0x03 | 0x04 | 0x05 | 0x06 | ... | 0x16 | 0x17 |
| 4 | 0x00 | 0x01 | 0x02 | 0x03 | 0x04 | 0x05 | 0x06 | ... | 0x16 | 0x17 |
| 5 | 0x00 | 0x01 | 0x02 | 0x03 | 0x04 | 0x05 | 0x06 | ... | 0x16 | 0x17 |
| .. | .. | .. | .. | .. | .. | .. | .. | .. | .. | .. |
| 97 | 0x00 | 0x01 | 0x02 | 0x03 | 0x04 | 0x05 | 0x06 | ... | 0x16 | 0x17 |
| 98 | 0x00 | 0x01 | 0x02 | 0x03 | 0x04 | 0x05 | 0x06 | ... | 0x16 | 0x17 |

FIG. 29

| N | +0 | +1 | +2 | +3 | +4 | +5 | +6 | +7 | +8 | +9 |
|---|----|----|----|----|----|----|----|----|----|----|
| +0 | O | O | O | × | O | O | × | O | O | × |
| +10 | O | O | × | O | O | × | O | O | × | O |
| +20 | O | × | O | O | × | O | O | × | O | O |
| +30 | × | O | O | × | O | O | × | O | O | × |
| +40 | O | O | × | O | O | × | O | O | × | O |
| +50 | O | × | O | O | × | O | O | × | O | O |
| +60 | × | O | O | × | O | O | × | O | O | × |
| +70 | O | O | × | O | O | × | O | O | × | O |
| +80 | O | × | O | O | × | O | O | × | O | O |

FIG. 30

| Byte Number | Content | Number of bytes |
|---|---|---|
| 0 | Disc Category and Version Number | 1 |
| 1 | Disc size | 1 |
| 2 | Disc structure | 1 |
| 3 | Recording density | 1 |
| 4 to 15 | Data Zone allocation | 12 |
| 16 | Set to (00) | 1 |
| : | : | : |
| : | : | : |

Byte 1-Disc size and maximum transfer rate
Bits b7 to b4   shall specify the disc size,
                they shall be set to 0000, indicating a 120 mm disc
Bits b3 to b0   shall specify the maximum read transfer rate
                they shall set to 1111 indicating no maximum read
                transfer rate is specified

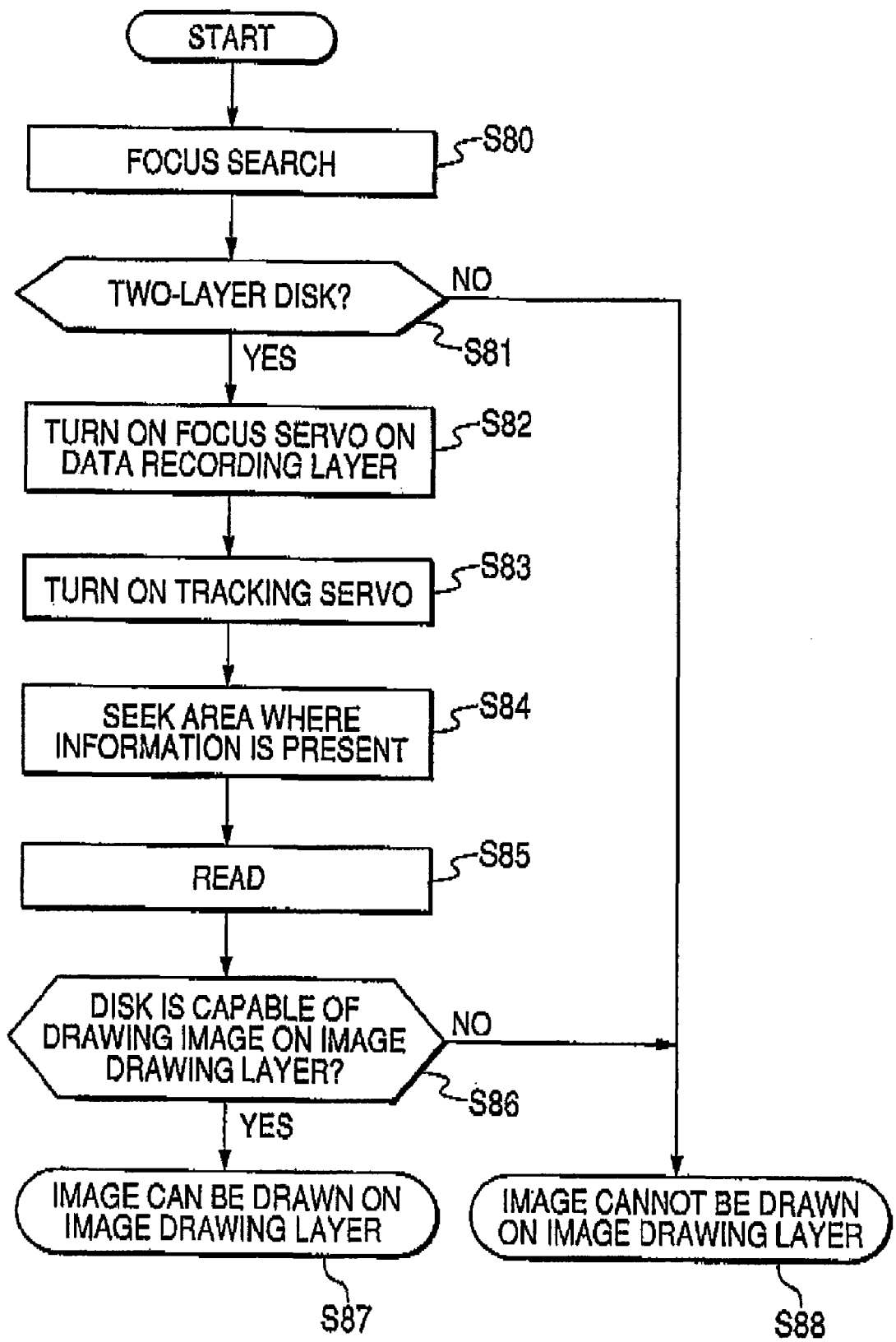

FIG. 32
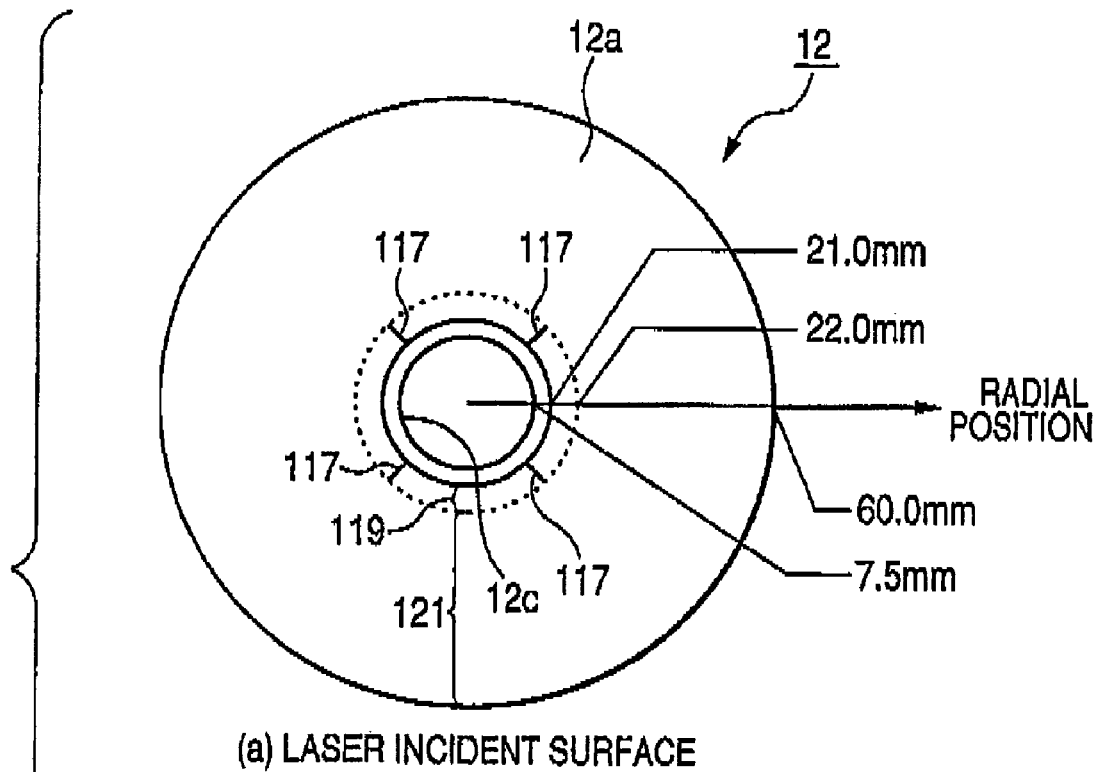
(a) LASER INCIDENT SURFACE
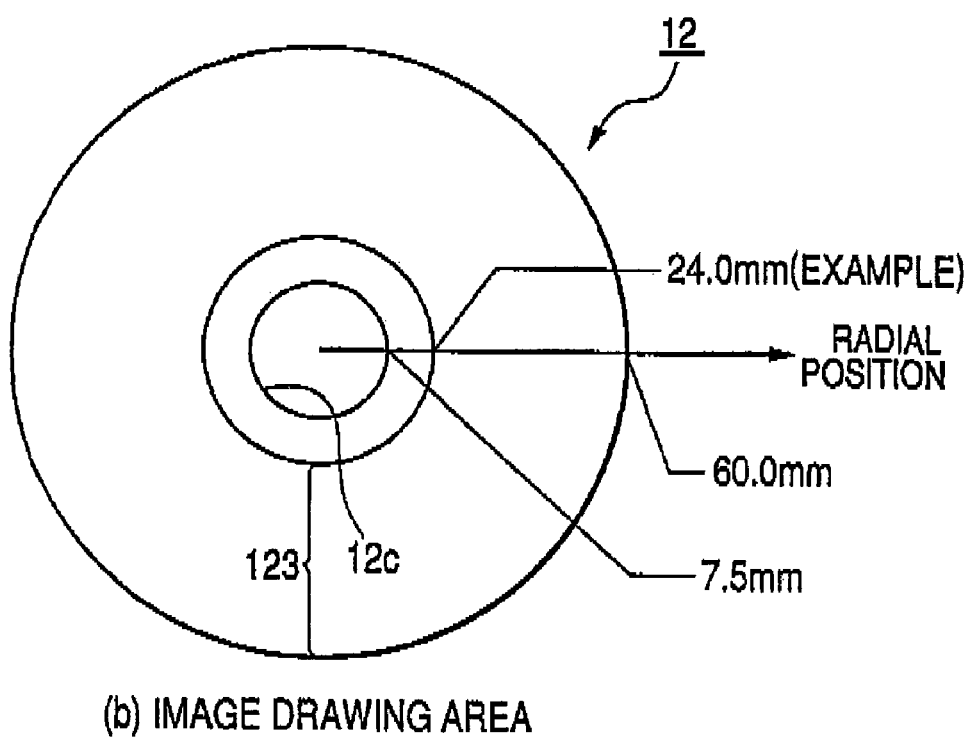
(b) IMAGE DRAWING AREA

OPTICAL DISK IMAGE DRAWING METHOD

BACKGROUND OF THE INVENTION

The present invention relates to an optical disk image drawing method for forming a visible image (drawing an image) such as a picture, a character or the like on the surface of an optical disk and more particularly to an optical disk image drawing method for controlling an image drawing position by a laser beam outputted from one laser diode to draw an image by the laser beam.

JP-A-2002-203321 and JP-A-2005-346886 disclose a technique that an image drawing layer composed of a thermal sensitive layer or a photosensitive layer is formed on a surface of an optical disk such as a CD capable of recording or a DVD capable of recording, an optical disk recording device for recording data in a data recording layer of the optical disk is used as an optical disk image drawing device, and a laser beam modulated in accordance with image data is applied to the image drawing layer from an optical pick-up to draw an image on the image drawing layer. In the technique disclosed in JP-A-2002-203321, the front surface and the back surface of the optical disk are inverted relative to the arrangement of the optical disk at the time of recording data to draw an image. In the technique disclosed in JP-A-2005-346886, two laser diodes are mounted on one optical pick-up, laser beams (main beam) respectively outputted therefrom are made to be coaxial, the data is recorded on the data recording layer by the laser beam outputted from the first laser diode thereof, position information is detected from the data recording layer by the laser beam at that time, and the image is drawn at a predetermined position of the image drawing layer by the laser beam outputted from the second laser diode on the basis of the detected position information.

In the image drawing method disclosed in JP-A-2002-203321, when the image is to be drawn on the optical disk arranged for the recording of the data, the optical disk needs to be temporarily ejected from an optical disk device, the front surface and the back surface of the optical disk needs to be inverted and the optical disk needs to be inserted again into the optical disk device. Thus, an operation is troublesome. In the technique disclosed in JP-A-2005-346886, both the recording of the data and the image drawing can be advantageously carried out without inverting the front and back surfaces of the optical disk. However, since the position information is detected from the data recording layer by the laser beam outputted from the first laser diode and the image is drawn at the predetermined position on the basis of the position information detected by the laser beam outputted from the second laser diode, separate laser beams are required to draw the image for controlling an image drawing position and for drawing the image.

SUMMARY OF THE INVENTION

It is an object of the present invention to solve disadvantages in the above-described related art and provide an optical disk image drawing method in which an image drawing position is controlled by a laser beam outputted from one laser diode and an image is drawn by the laser beam.

<Control of Position in Rotating Direction of Disks>

A first optical disk image drawing method of the present invention concerns an optical disk image drawing method of forming a visible image on an optical disk that includes a data recording layer formed with a track and storing predetermined information along the track and an image drawing layer on which the visible image is to be formed and which is laminated on the data recording layer, wherein data can be recorded on the data recording layer and visible image can be formed on the image drawing layer by applying a laser beam from a same surface side of the optical disk, the method comprising:

rotating the optical disk by a spindle motor;

reading the predetermined information recorded on the track by focusing a laser beam having a reproducing power outputted from an optical pick-up on the data recording layer and tracking the laser beam on the track of the data recording layer;

detecting a predetermined position on the track based on the read predetermined information as a reference position in the rotating direction;

measuring a position of the spindle motor in a rotating direction with respect to the reference position;

changing focus of the laser beam from the data recording layer to the image drawing layer after the reference position is detected;

starting forming the visible image on the image drawing layer from a predetermined relative position of the spindle motor in the rotating direction with respect to the reference position based on the measured position of the spindle motor in the rotating direction; and sequentially moving the optical pick-up in the radial direction synchronously with the rotation of the spindle motor to proceed to form the visible image after the forming operation of the visible image is started.

According to the first optical disk image drawing method, the forming operation of the visible image can be started from the predetermined position in the rotating direction using the predetermined position on the track as a reference by employing the laser beam outputted from one laser diode. Since the forming operation of the visible image can be started from the predetermined position in the rotating direction using the predetermined position on the track as a reference, the orientation of the visible image relative to the optical disk can be controlled. Accordingly, for instance, when the optical disk is ejected from an optical disk device, then, the optical disk is inserted again into the optical disk device to additionally draw an image (additional write, overwrite, etc.) after the image is drawn on the optical disk, the image can be additionally drawn by setting the orientation of the image to correspond to or substantially correspond to the orientation of the previously formed image. Further, when a character or a figure is previously printed on a part of a label surface by employing the predetermined position on the track as a reference position in the rotating direction, even if the image is not additionally drawn, an image can be drawn so that its orientation is set to correspond to or substantially correspond to the orientation of the figure.

In the first optical disk image drawing method, the position of the spindle motor in the rotating direction with respect to the reference position can be measured by, for instance, counting the number of pulses of FG pulse generated from the spindle motor. In this case, the rotating speed of the spindle motor is controlled to be constant, and the time difference between the detecting timing of the predetermined position on the track and the generating timing of the FG pulse produced adjacently to the detecting timing is measured to correct the time difference and measure the position of the spindle motor in the rotating direction. Thus, the position of the spindle motor in the rotating direction with respect the predetermined position on the track can be accurately measured.

<Position Control in the Radial Direction of Disk 1>

A second optical disk image drawing method of the present invention concerns an optical disk image drawing method of forming a visible image on an optical disk that includes a data recording layer formed with a track and storing predetermined information along the track and an image drawing layer on which the visible image is to be formed and which is laminated on the data recording layer, wherein data can be recorded on the data recording layer and visible image can be formed on the image drawing layer by applying a laser beam from a same surface side of the optical disk, the method comprising:

rotating the optical disk by a spindle motor;

reading the predetermined information recorded on the track by focusing a laser beam having a reproducing power outputted from an optical pick-up on the data recording layer and tracking the laser beam on the track of the data recording layer;

detecting a predetermined position on the track based on the read predetermined information as a reference position in the rotating direction;

measuring a position of the optical pickup in a disk radial direction with respect to the reference position in the;

changing focus of the laser beam from the data recording layer to the image drawing layer after the reference position is detected;

starting forming the visible image on the image drawing layer from a predetermined relative position of the optical pickup in the disk radial direction with respect to the reference position based on the measured position of the optical pickup in the disk radial direction; and sequentially moving the optical pick-up in the disk radial direction synchronously with the rotation of the spindle motor to proceed to form the visible image after the forming operation of the visible image is started.

The position of the optical pick-up in the disk radial direction with respect to the reference position can be measured in accordance with, for instance, an amount of operation of a feed motor of the optical pick-up.

According to the second optical disk image drawing method, the forming operation of the visible image can be started from the predetermined relative position in the disk radial direction with respect to the predetermined position in the track by using the laser beam outputted from one laser diode.

<Position Control Using Position Control in Rotating Direction of Disk Combined with Position Control 1 in the Radial Direction of Disk>

A third optical disk image drawing method of the present invention concerns an optical disk image drawing method of forming a visible image on an optical disk that includes a data recording layer formed with a track and storing predetermined information along the track and an image drawing layer on which the visible image is to be formed and which is laminated on the data recording layer, wherein data can be recorded on the data recording layer and visible image can be formed on the image drawing layer by applying a laser beam from a same surface side of the optical disk, the method comprising:

rotating the optical disk by a spindle motor;

reading the predetermined information recorded on the track by focusing a laser beam having a reproducing power outputted from an optical pick-up on the data recording layer and tracking the laser beam on the track of the data recording layer;

detecting a predetermined position on the track based on the read predetermined information as a reference position in the rotating direction and in the disk radial direction;

measuring a position of the spindle motor in a rotating direction and a position of the optical pickup in a disk radial direction with respect to the reference position;

changing focus of the laser beam from the data recording layer to the image drawing layer after the reference position is detected; and starting forming the visible image on the image drawing layer from a predetermined relative position of the spindle motor in the rotating direction with respect to the reference position and a predetermined relative position of the optical pickup in the disk radial direction with respect to the reference position based on the measured position of the spindle motor in the rotating direction and the measured position of the optical pickup in the disk radial direction.

According to the third optical disk image drawing method, the laser beam outputted from one laser diode is used so that the forming operation of the visible image can be started from the predetermined position in the rotating direction using the predetermined position of the optical disk as a reference and the predetermined relative position in the radial direction with respect to the predetermined position.

<Position Control 2 in Radial Direction of Disk>

A fourth optical disk image drawing method of the present invention concerns an optical disk image drawing method of forming a visible image on an optical disk that includes a data recording layer formed with a track and storing predetermined information along the track and an image drawing layer on which the visible image is to be formed and which is laminated on the data recording layer, wherein data can be recorded on the data recording layer and visible image can be formed on the image drawing layer by applying a laser beam from a same surface side of the optical disk, the method comprising:

rotating the optical disk by a spindle motor;

reading the predetermined information recorded on the track by focusing a laser beam having a reproducing power outputted from an optical pick-up on the data recording layer and tracking the laser beam on the track of the data recording layer;

detecting a predetermined image drawing operation start position on the track from the read predetermined information;

changing focus of the laser beam from the data recording layer to the image drawing layer at a position of the optical pickup in a disk radial direction where the predetermined image drawing operation start position is detected to start forming the visible image on the image drawing layer; and sequentially moving the optical pick-up in the radial direction synchronously with the rotation of the spindle motor to proceed to form the visible image after the forming operation of the visible image is started.

According to the fourth optical disk image drawing method, the laser beam outputted from one laser diode is used so that the forming operation of the visible image can be started from the position of the optical pick-up in the disk radial direction where the predetermined image drawing operation start position is detected.

<Position Control by Track Pitch>

A fifth optical disk image drawing method of the present invention concerns an optical disk image drawing method of forming a visible image on an optical disk that includes a data recording layer formed with a track and storing position information along the track and an image drawing layer on which the visible image is to be formed and which is laminated on the data recording layer, wherein data can be recorded on the data recording layer and visible image can be formed on the image drawing layer by applying a laser beam from a same surface side of the optical disk, the method comprising:

(a) rotating the optical disk by a spindle motor;

(b) reading the position information recorded on the track by focusing a laser beam having a reproducing power outputted from an optical pick-up on the data recording layer by a focus control and tracking the laser beam on the track of the data recording layer by a tracking control;

(c) holding the tracking control and changing focus of the laser beam from the data recording layer to the image drawing layer at a position in a disk radial direction where the position information representing a predetermined image drawing operation start position is detected and carrying out a forming operation of the visible image to be formed at a position in the disk radial direction from a predetermined position of the spindle motor in the rotating direction;

(d) setting the laser beam to a reproducing power, returning the focus of the laser beam from the image drawing layer to the data recording layer and tracking the laser beam on the track of the data recording layer after the forming operation of the visible image at the position in the radial direction is completed;

(e) holding the tracking control and changing focus of the laser beam from the data recording layer to the image drawing layer at a position of the track adjacent to the position in the disk radial direction where the tracking control has been held and carrying out the forming operation of the visible image to be formed at a position in the disk radial direction from a predetermined position of the spindle motor in the rotating direction; and (f) subsequently repeating the steps (d) and (e) to sequentially move the radial position where the forming operation of the visible image is carried out at a pitch of the track and form the visible image.

According to the fifth optical disk image drawing method, the image drawing or drawing position can be controlled by the laser beam outputted from one laser diode to draw or form the image at the track pitch. In this fifth optical disk image drawing method, if the visible image to be formed has a no-image area in the radial direction where the visible image does not need to be formed in an intermediate position in the radial direction, the method further comprises the steps of:

setting the laser beam to the reproducing power, and focusing the laser beam to the data recording layer when the position in the radial direction where the forming operation of the visible image is performed reaches a start position of the no-image area;

seeking a forming operation restart position of the visible image that passes an end position of the no-image area based on the position information recorded in the data recording layer;

holding the tracking control and changing the focus of the laser beam from the data recording layer to the image drawing layer at a position where the forming operation restart position of the visible image is sought; and carrying out the forming operation to be formed at the position where the forming operation restart position of the visible image is sought from the predetermined position of the spindle motor in the rotating direction.

In the first to fifth optical image drawing methods, as the "predetermined information" or the "position information", pre-format Information, for instance, an ATIP (Absolute Time in Pre-Groove), an ADIP (Address in Pre-groove) of a DVD+R format, a land pre-pit of a DVD-R format, etc. can be used. Further, in the case of what is called a hybrid CD-R disk in which a first session is already recorded and parts after a second session can be recorded by a user, the position information of sub-codes of the first session can be used in place of the position Information by the ATIP. Further, in the case of a DVD capable of recording data corresponding to the hybrid CD-R, the reference position can be set in accordance with the position information by an ECC block of the already recorded data area.

BRIEF DESCRIPTION OF THE DRAWINGS

FIG. 4 is a partly enlarged sectional view showing other arrangement example of the structure of layers of the optical disk 12 of FIG. 1 and the laser beam.

FIG. 5 is a partly enlarged sectional view showing other arrangement example of the structure of layers of the optical disk 12 of FIG. 1 and the laser beam.

FIG. 13 is a schematic diagram showing an example for setting a reference angle line 110 of the optical disk 12.

FIG. 24 is a diagram showing the data structure of an ATIP of a CD format.

FIG. 25 is a diagram showing the data structure of a sub-code of the CD format.

FIG. 28 is a diagram showing a definition example of disk identifying information allowing image drawing by the main data of the CD format.

FIG. 29 is a diagram showing a definition example of disk identifying. information allowing image drawing by the CRC error generating pattern of the CD format FIG. 30 is a diagram showing the data structure of an ADIP of a DVD+R format.

FIG. 31 is a flowchart showing a deciding method of a disk capable of drawing an image by an optical disk device 10 when the disk identifying Information allowing image drawing is recorded on the data recording layer.

FIG. 32 is a diagram showing an example of the form of a disk identifying mark allowing image drawing in the optical disk 12.

DETAILED DESCRIPTION OF PREFERRED EMBODIMENTS

Figure 1:
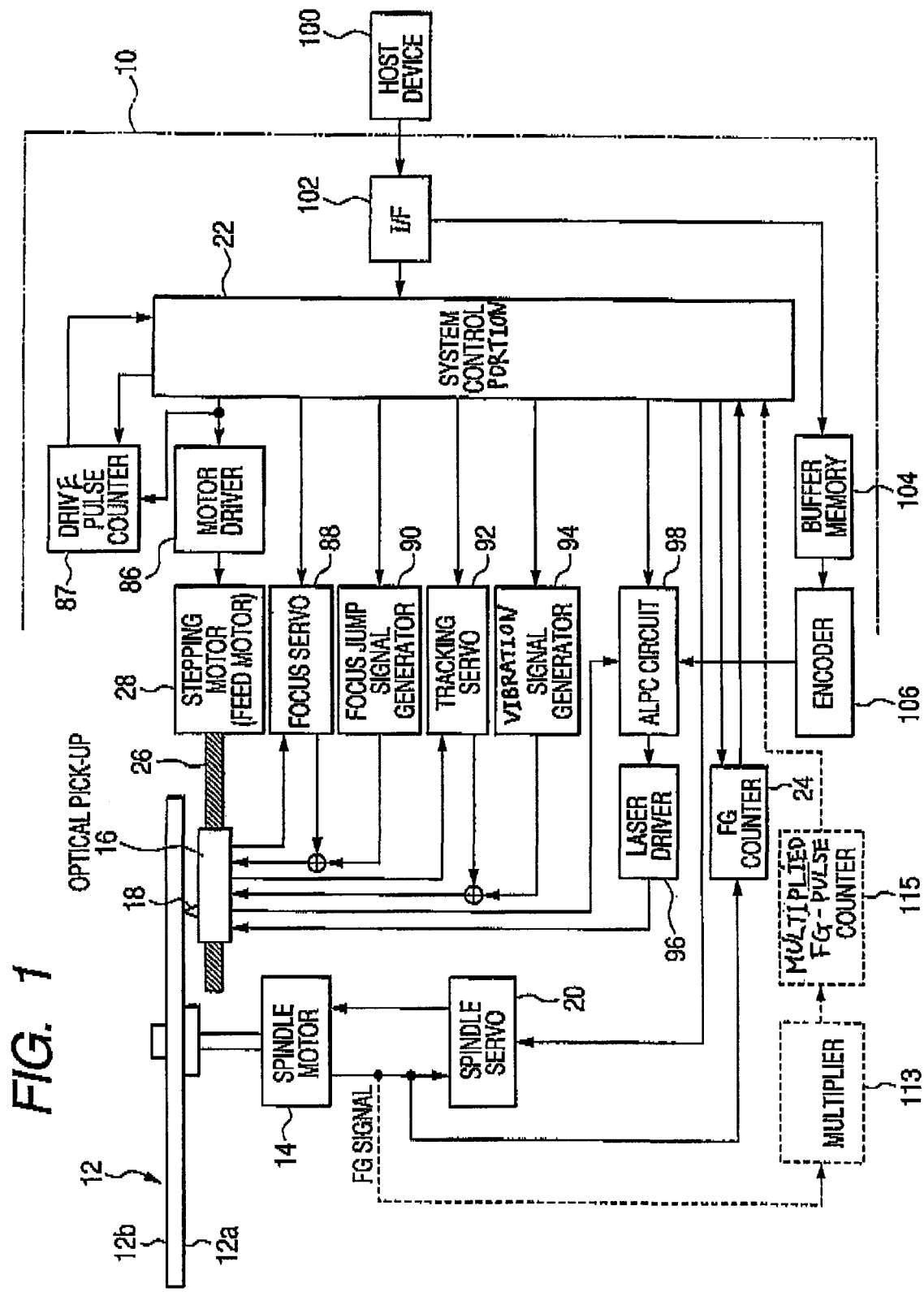
FIG. 1 is a block diagram showing the structure of a system according to an embodiment of the present invention.

First Embodiment: Embodiment of First to Third Optical Disk Image Drawing Methods Now, a first embodiment of the present invention will be described. FIG. 1 shows the structure of a system of an optical disk device to which the present invention is applied. In the optical disk device 10, an optical disk 12 is formed as an optical disk capable of recording and drawing an image in which a data recording layer and an image drawing layer are laminated and formed. The image drawing layer is composed of a thermal sensitive material or a photosensitive material and whose visibility is changed by applying a laser beam thereto. The image drawing layer can be composed of, for instance, the same coloring matter material as that of the data recording layer. On the data recording layer, a wobble groove is formed as a track. The image drawing layer has a layer exclusive for drawing an image and further, alternatively one layer of two layers that are originally prepared as data recording layers like an existing DVD-R(+R) having one surface composed of two layers can be used as an image drawing layer. The optical disk 12 is rotated and driven by a spindle motor 14 and the recording of data, the reproduction of data and the drawing of an image are selectively (asynchronously) carried out by one laser beam 18 (main beam) outputted from an optical pick-up 16. The front surface and the back surface of the optical disk 12 do not need to be inverted at the time of recording and reproducing the data and drawing the image. Recording data is recorded on the data recording layer so that the density of data in the direction of a circumference of the disk is constant (namely, so as to have constant linear velocity) irrespective of a position of the disk in the radial direction. Further, the image is drawn on the image drawing layer so that the number of pixels for one circumference is constant (that is, the density of the pixels of a circumference of the disk in the direction is the more increased in an inner peripheral side) irrespective of the position of the disk in the radial direction.

A spindle servo 20 controls the rotation of the spindle motor 14 in accordance with a command of a system control portion 22 (microcomputer). The spindle motor 14 is CLV (constant linear velocity) controlled or CAV (constant angular velocity) controlled at the time of recording data and CAV controlled at the time of drawing an image. A predetermined number of pulses of FG pulse are outputted for each rotation from the spindle motor 14 at intervals of equal angle. An FG counter 24 counts the number of pulses of the FG pulse.

The optical pick-up 16 is supported by a feed screw 26 fixed and arranged in parallel with the surface of the optical disk 12 and along the disk radial direction (toward the direction of a central axis of the disk) and a stepping motor 28 rotates and drives the feed screw 26 about its axis of the screw so that the optical pick-up is moved in the disk radial direction. Both the recording of the data and the image drawing are performed from the inner peripheral side to the outer peripheral side of the optical disk 12.

A structural example of layers of the optical disk 12 will be described by referring to FIGS. 2 to 7. In any of the structures of the layers shown in FIGS. 2 to 7, the image drawing layer is arranged in a side closer to a viewing point from which the image drawn on the image drawing layer is viewed with respect to the data recording layer so that the image can be easily visually recognized. In FIGS. 2 to 7, a state is shown when the laser beam 18 outputted from an objective lens 30 of the optical pick-up 16 is controlled to focus on the image drawing layer to draw the image. At the time of recording the data and at the time of reproducing the data, the laser beam 18 is controlled to focus on the data recording layer. In FIGS. 2 to 7, the same reference numerals are used for common parts. The data recording layer is designated by "A", the image drawing layer is designated by "B" and the groove of the data recording layer A is designated by "C", respectively.

Figure 2:
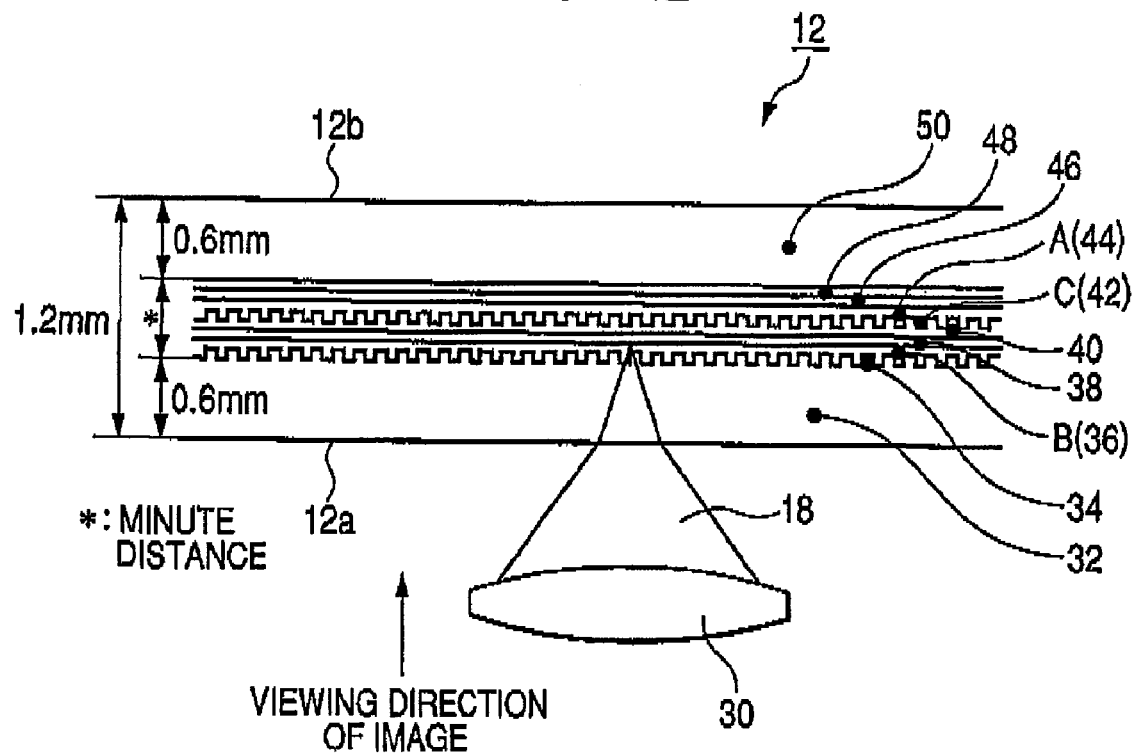
FIG. 2 is a partly enlarged sectional view showing an arrangement example of the structure of layers of an optical disk 12 of FIG. 1 and a laser beam.

(Structural Example 1 of Layers of Optical Disk: FIG. 2)

An optical disk 12 shown in FIG. 2 is the existing DVD-R (+R) having one surface composed of two layers. In the optical disk 12, a coloring matter layer 36 as the image drawing layer B, a translucent reflecting layer 38, an intermediate layer 40 made of a transparent resin forming a spacer, a coloring matter layer 44 as the data recording layer A and a reflecting layer 46 are sequentially laminated on a surface, on which grooves 34 are formed, of a polycarbonate substrate 32 having the thickness of 0.6 mm. Grooves C (42) are formed on the upper surface of the intermediate layer 40 by a stamper. A polycarbonate substrate 50 having the thickness of 0.6 mm is bonded to the upper part of the reflecting layer 46 by an adhesive layer 48. Thus, the entire part of the optical disk 12 is formed integrally with the thickness of 1.2 mm (the thickness of the entire part of the laminated body interposed between the polycarbonate substrates 32 and 50 is extremely small). The coloring matter layer 38 originally forms the data recording layer as a use of the DVD-R(+R), however, the coloring matter layer 36 is used as the image drawing layer B herein. Position Information such as a land pre-pit, an ADIP or the like is previously respectively recorded in the grooves 34 and C(42). When the data is recorded, the laser beam 18 for the DVD outputted from the objective lens 30 of the optical pick-up 16 is controlled to focus on the data recording layer A. When the image is drawn, the laser beam 18 for the DVD is controlled to focus on the image drawing layer B. The visible image drawn on the image drawing layer B can be visually viewed from a surface 12a side on which the laser beam 18 of the optical disk 12 is incident (refer it to as a "laser incident surface"). On the side of a surface (refer it to as a "label surface") 12b opposite to the laser incident surface 12a of the optical disk 12, a printing layer having another image previously printed (or capable of being printed by a user) can be separately formed.

Figure 3:
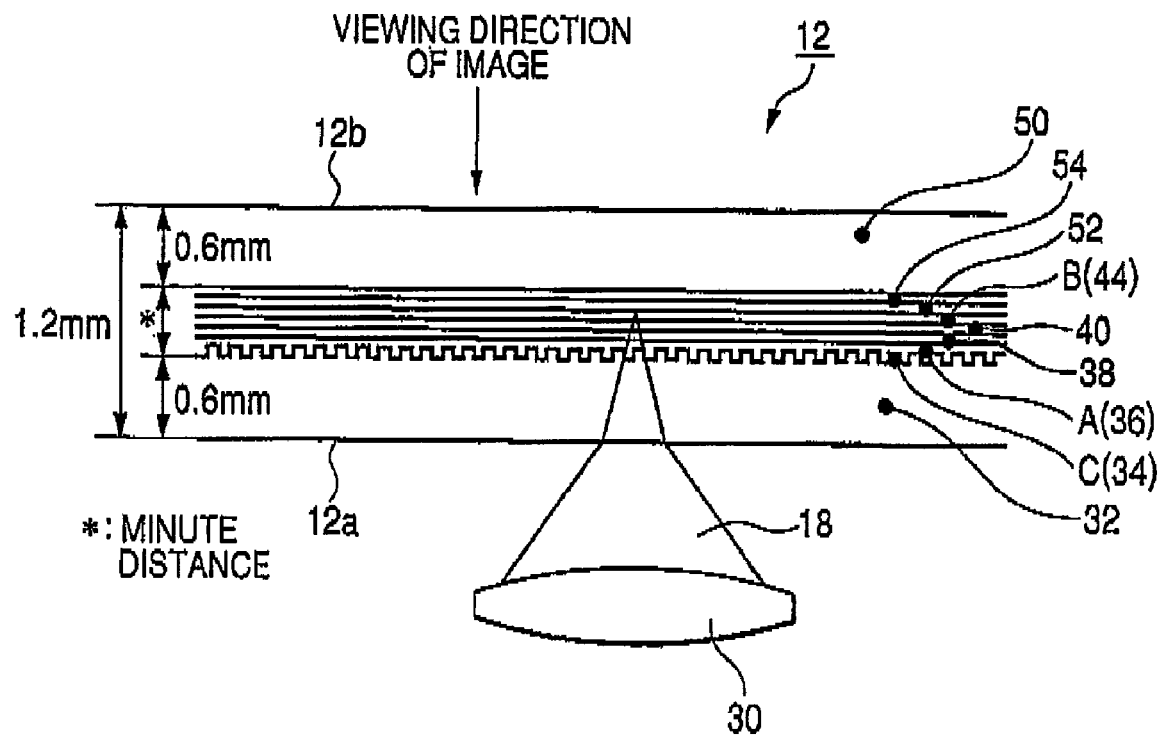
FIG. 3 is a partly enlarged sectional view showing another arrangement example of the structure of layers of the optical disk 12 of FIG. 1 and the laser beam.

<Structural Example 2 of Layers of Optical Disk: FIG. 3>

An optical disk 12 shown in FIG. 3 is a DVD-R(+R) having one surface composed of one layer to which an image drawing layer is added. In the optical disk 12, a coloring matter layer 36 as the data recording layer A, a translucent reflecting layer 38, an intermediate layer 40 made of a transparent resin forming a spacer, a coloring matter layer 44 as the image drawing layer B and a translucent reflecting layer 52 are sequentially laminated on a surface, on which grooves C(34) are formed, of a polycarbonate substrate 32 having the thickness of 0.6 mm. A polycarbonate substrate 50 having the thickness of 0.6 mm is bonded to the upper part of the translucent reflecting layer 52 by a transparent adhesive layer 54. Thus, the entire part of the optical disk 12 is formed integrally with the thickness of 1.2 mm (the thickness of the entire part of a laminated body interposed between the polycarbonate substrates 32 and 50 is extremely small). Position information such as a land pre-pit, an ADIP or the like is previously recorded in the grooves C. When the data is recorded, the laser beam 18 for the DVD outputted from the objective lens 30 of the optical pick-up 16 is controlled to focus on the data recording layer A. When the image is drawn, the laser beam 18 for the DVD is controlled to focus on the image drawing layer B. The visible image drawn on the image drawing layer B can be visually viewed from a label surface 12b side of the optical disk 12.

<Structural Example 3 of Layers of Optical Disk: FIG. 4>

An optical disk 12 shown in FIG. 4 is a DVD-R(+R) having one surface composed of one layer to which an image drawing layer is added. The optical disk 12 shown in FIG. 4 is different from the optical disk 12 shown in FIG. 3 in the viewing direction at the drawn visible image. That is, in the optical disk 12 shown in FIG. 4, a coloring matter layer 36 as the image drawing layer B, a translucent reflecting layer 38, an intermediate layer 40 made of a transparent resin forming a spacer, a coloring matter layer 44 as the data recording layer A and a reflecting layer 46 are sequentially laminated on a surface of a polycarbonate substrate 32 having the thickness of 0.6 mm and having no grooves. On the upper surface of the intermediate layer 40, the grooves C (42) are formed by a stamper. A polycarbonate substrate 50 having the thickness of 0.6 mm is bonded to the upper part of the reflecting layer 46, by an adhesive layer 48. Thus, the entire part of the optical disk 12 is formed integrally with the thickness of 1.2 mm (the thickness of the entire part of a laminated body sandwiched in between the polycarbonate substrates 32 and 50 is extremely small). In the grooves C, position information such as a land pre-pit, an ADIP or the like is previously recorded. When the data is recorded, the laser beam 18 for the DVD outputted from the objective lens 30 of the optical pick-up 16 is controlled to focus on the data recording layer A. When the image is drawn, the laser beam 18 for the DVD is controlled to focus on the image drawing layer B. The visible image drawn on the image drawing layer B can be visually viewed from a laser incident surface 12a side of the optical disk 12. On the surface of a label surface 12b, a printing layer having another image previously printed (or capable of being printed by a user) can be separately formed, <Structural Example 4 of Layers of Optical Disk: FIG. 5>

An optical disk 12 shown in FIG. 5 is formed as a CD-R having one surface composed of two layers. In the optical disk 12, a coloring matter layer 60 as the data recording layer A, a translucent reflecting layer 62, an intermediate layer 64 made of a transparent resin forming a spacer, a coloring matter layer 88 as the image drawing layer B, a translucent reflecting layer 70 and a transparent protecting layer 72 are sequentially laminated on a surface, on which grooves C (58) is formed, of a polycarbonate substrate 56 having the thickness of 1.2 mm. An entire part is formed integrally with the thickness of 1.2 mm (the thickness of the entire part of a laminated body on the polycarbonate substrate 56 is very small). Grooves 66 are formed on the upper surface of the intermediate layer 64 by a stamper. The coloring matter layer 68 originally forms the data recording layer as a use of the CD-R, however, the coloring matter layer 68 is used as the image drawing layer B herein. In the grooves C (58) and 66, position information such as an ATIP or the like is respectively previously recorded. When the data is recorded, the laser beam 18 for the CD outputted from the objective lens 30 of the optical pick-up 16 is controlled to focus on the data recording layer A. When the image is drawn, the laser beam 18 for the CD is controlled to focus on the image drawing layer B. The visible image drawn on the image drawing layer B can be visually viewed from a label surface 12b side of the optical disk 12.

Figure 6:
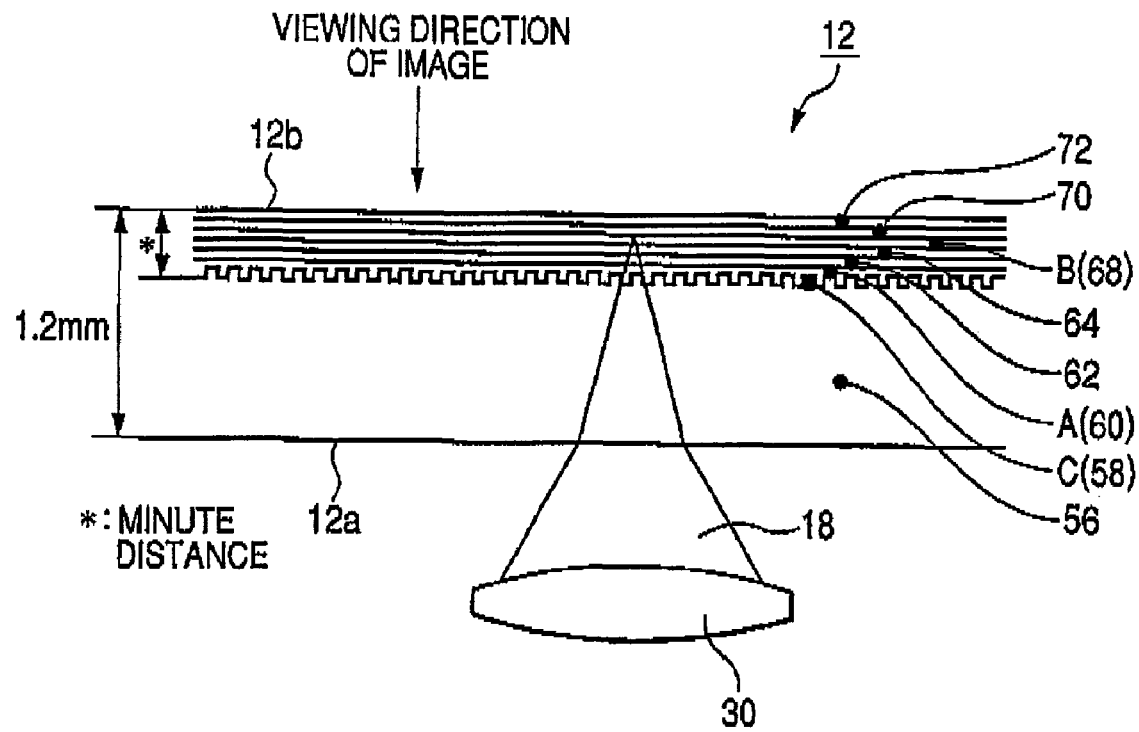
FIG. 6 is a partly enlarged sectional view showing other arrangement example of the structure of layers of the optical disk 12 of FIG. 1 and the laser beam.

<Structural Example 6 of Layers of Optical Disk: FIG. 6>

An optical disk 12 shown in FIG. 6 is formed as a CD-R having an Image drawing layer added. In the optical disk 12, a coloring matter layer 60 as the data recording layer A, a translucent reflecting layer 62, an intermediate layer 64 made of a transparent resin forming a spacer, a coloring matter layer 68 as the image drawing layer B, a translucent reflecting layer 70 and a transparent protecting layer 72 are sequentially laminated on a surface of a polycarbonate substrate 56 having the thickness of 1.2 mm and having grooves C (58) formed. An entire part is formed integrally with the thickness of 1.2 mm (the thickness of the entire part of a laminated body on the polycarbonate substrate 56 is very small). Position information such as an ATIP or the like is previously recorded in the grooves C. When the data is recorded, the laser beam 18 for the CD outputted from the objective lens 30 of the optical pick-up 16 is controlled to focus on the data recording layer A. When the image is drawn, the laser beam 18 for the CD is controlled to focus on the image drawing layer B. The visible image drawn on the image drawing layer B can be visually viewed from a label surface 12b side of the optical disk 12.

Figure 7:
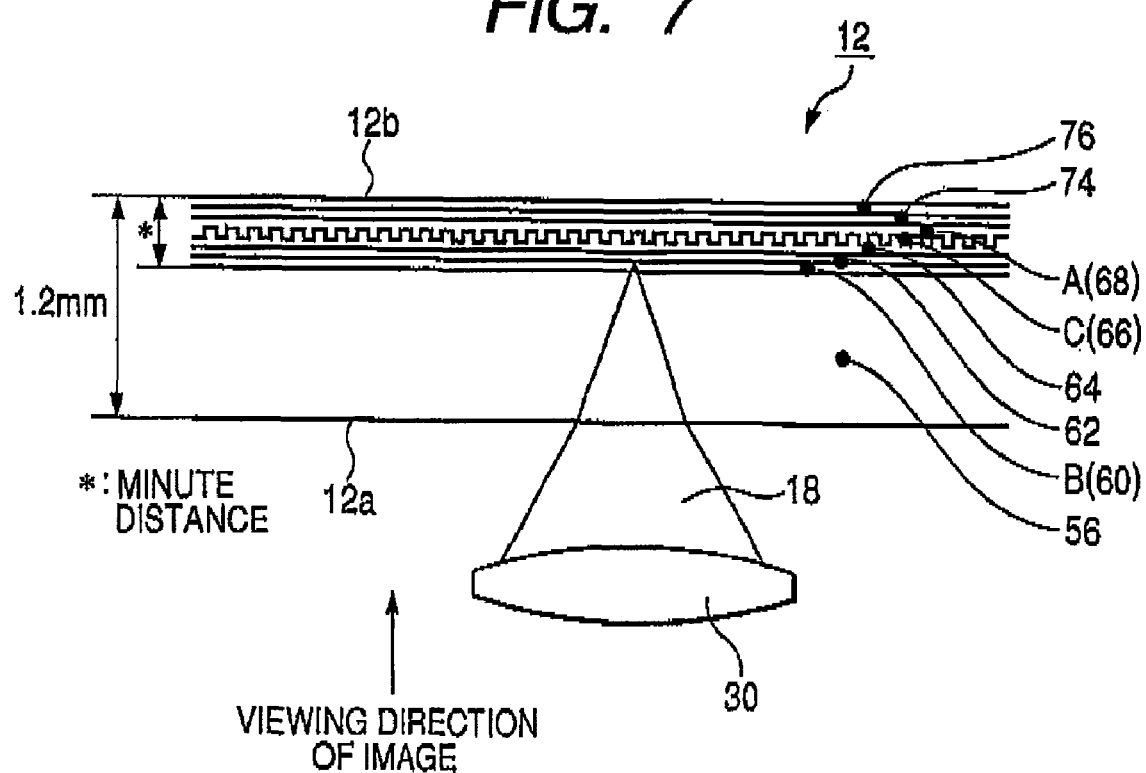
FIG. 7 is a partly enlarged sectional view showing other arrangement example of the structure of layers of the optical disk 12 of FIG. 1 and the laser beam.

<Structural Example 6 of Layers of Optical Disk: FIG. 7>

An optical disk 12 shown in FIG. 7 is formed as a CD-R having an image drawing layer added. The optical disk 12 shown in FIG. 7 is different from the optical disk 12 shown in FIG. 6 in the viewing direction at the drawn visible image. That is, in the optical disk 12 shown in FIG. 7, a coloring matter layer 60 as the image drawing layer B, a translucent reflecting layer 62, an intermediate layer 64 made of a transparent resin forming a spacer, a coloring matter layer 68 as the data recording layer A, a reflecting layer 74 and a protecting layer 76 are sequentially laminated on a surface of a polycarbonate substrate 56 having the thickness of 1.2 mm and having no grooves. An entire part is formed integrally with the thickness of 1.2 mm (the thickness of the entire part of a laminated body on the polycarbonate substrate 56 is very small). Position information such as an ATIP or the like is previously recorded in grooves C. When the data is recorded, the laser beam 18 for the CD outputted from the objective lens 30 of the optical pick-up 16 is controlled to focus on the data recording layer A. When the image is drawn, the laser beam 18 for the CD is controlled to focus on the image drawing layer B. The visible image drawn on the image drawing layer B can be visually viewed from a laser incident surface 12a side of the optical disk 12. A printing layer having another image previously printed (or capable of being printed by a user) can be separately formed on the surface of a label surface 12b.

<Structure and Operation of Optical Disk Apparatus 10>

Returning to FIG. 1, a motor driver 86 applies a drive pulse to the stepping motor 28 to move the optical pick-up 16 by an amount of movement corresponding to the number of drive pulses in the disk radial direction. A drive pulse counter 87 counts up or down the number of pulses of the drive pulse of the stepping motor 28 in the driving direction thereof to measure the amount of movement of the optical pick-up 16 in the disk radial direction. Both the FG counter 24 and the drive pulse counter 87 can be also realized by a counter implemented by software set in the system control portion 22. A focus servo 88 carries out a focus control of the optical pick-up 16. A focus jump signal generator 90 generates a focus jump signal (a jump pulse) for switching an object to which the focus control of the optical pick-up 16 is carried out to the image drawing layer B from the data recording layer A, and to the data recording layer A from the image drawing layer B. The change of the object layer to which the focus control is carried out using the focus jump signal can be realized by using a well-known method for changing an object to which the focus control is carried out in recording and reproducing the DVD having the one surface composed of the two layers or a DVD having two surfaces composed two layers.

A tracking servo 92 carries out a tracking control of the optical pick-up 16. When the image is drawn, the tracking control relative to the image drawing layer B of the optical disk 12 is held (an operation for holding a tracking driving signal value applied to a tracking actuator to a value immediately before that value) or turned off (an operation for setting the tracking driving signal value applied to the tracking actuator to 0) irrespective of whether or not the image drawing layer B has grooves (namely, even when the image drawing layer B has the grooves, the grooves are not used for drawing the image). Instead thereof, the stepping motor 28 is driven synchronously with the rotation of the optical disk 12 to sequentially move the optical pick-up 16 at a predetermined pitch in the disk radial direction. At this time, the amount of movement of the optical pick-up 16 in the disk radial direction is detected by counting the number of pulses of the drive pulse of the stepping motor 28 by the drive pulse counter 87. As described above, the control of the movement of the optical pick-up 16 in the disk radial direction at the time of drawing the image is carried out by driving the stepping motor 28 synchronously with the rotation of the optical disk 12 without relying on the tracking control. Thus, the image can be drawn irrespective of whether or not the image drawing layer B of the optical disk 12 has the grooves. Further, even when the image drawing layer B has the grooves (for instance, the above-described grooves 34 of the image drawing layer B converted from the data recording layer 36 in FIG. 2, the grooves 66 of the image drawing layer B converted from the data recording layer 68 in FIG. 5), the image is drawn irrespective of the grooves (that is, without following the grooves), so that intervals at which pixels are arranged in the disk radial direction can be independently set without depending on intervals at which the grooves are arranged in the disk radial direction (track pitch) and a degree of freedom can be obtained for forming image data {formed by the assembly of pixel data (data representing a gradation for each pixel to be drawn)}.

An vibration signal generator 94 generates an vibration signal at the time of drawing the image and applies the vibration signal to the tracking actuator of the optical pick-up 16 to vibrate the objective lens 30 (FIGS. 2 to 7) thereby making the laser beam 18 to cause the microvibrations of in the radial direction of the optical disk 12. By this vibration operation, the laser beam 18 meanders on the image drawing layer B of the optical disk 12 in accordance with the rotation of the disk and moves in the direction of the circumference of the disk. While the laser beam 18 is turned a plurality of times at the same radial position, the optical pick-up 16 is sequentially moved by a predetermined micro pitch at a time in the outer peripheral direction to draw the image. Thus, the image can be formed without having little space in the disk radial direction. A method for drawing an image by turning the laser beam 18 a plurality of times at the same radial direction to draw an image is described in detail in JP-A-2004-5847 and JP-A-2004-5848 filed by the applicant of the present invention.

A laser driver 96 drives a laser diode (not shown in the drawing) in the optical pick-up 16. An ALPC (Automatic laser Power Control) circuit 98 controls the power of the laser beam 18 outputted from the optical pick-up 16 to a value commanded by the system control portion 22.

An encoder 106 encodes recording data to a predetermined format at the time of recording the data. The laser driver 96 modulates the laser beam 18 outputted from the optical pick-up 16 in accordance with the encoded recording data and records the recording data in the data recording layer A of the optical disk 12 as pits. The encoder 106 generates, at the time of drawing the image, a pulse signal (an image drawing pulse) whose duty changes in accordance with the gradation data of the pixels respectively forming the image data and having a constant cycle for each pixel (below-described time corresponding to an angle Δθ of one pixel shown in FIG. 9). The laser driver 96 modulates the laser beam 18 outputted from the optical pick-up 16 in accordance with the pulse signal whose duty changes to change visible light characteristics of the image drawing layer B of the optical disk 12. One pixel of the drawn image is recognized as one point (a dot) by a human eye. Further, the difference of the duty of the dots is perceived as the difference of the density of the drawn image by the human eye (when the duty is higher, the drawn image is perceived to be the thicker), so that the image drawing can be realized by a monochromatic multi-gradation.

A host device (a host computer) 100 transmits to the optical disk device 10 the recording data at the time of recording the data and the image data at the time of drawing the image. The transmitted recording data or the image data is received by an interface 102 of the optical disk device 10, temporarily stored in a buffer memory 104, then, read from the buffer memory 104 and supplied to the encoder 106 to carry out the above-described encoding process and record the data or draw the image. At the time of reproducing the data, the data reproduced by a decoder (not shown in the drawing) is transferred to the host device 100 through the interface 102. Further, the host device 100 transmits a command issued by an operator to the optical disk device 10 at the time of recording the data, at the time of reproducing the data and at the time of drawing the image. This command is transmitted to the system control portion 22 through the interface 102. The system control portion 22 sends an instruction in accordance with the command respectively to circuits of the optical disk device 10 to perform corresponding operations.

Figure 8:
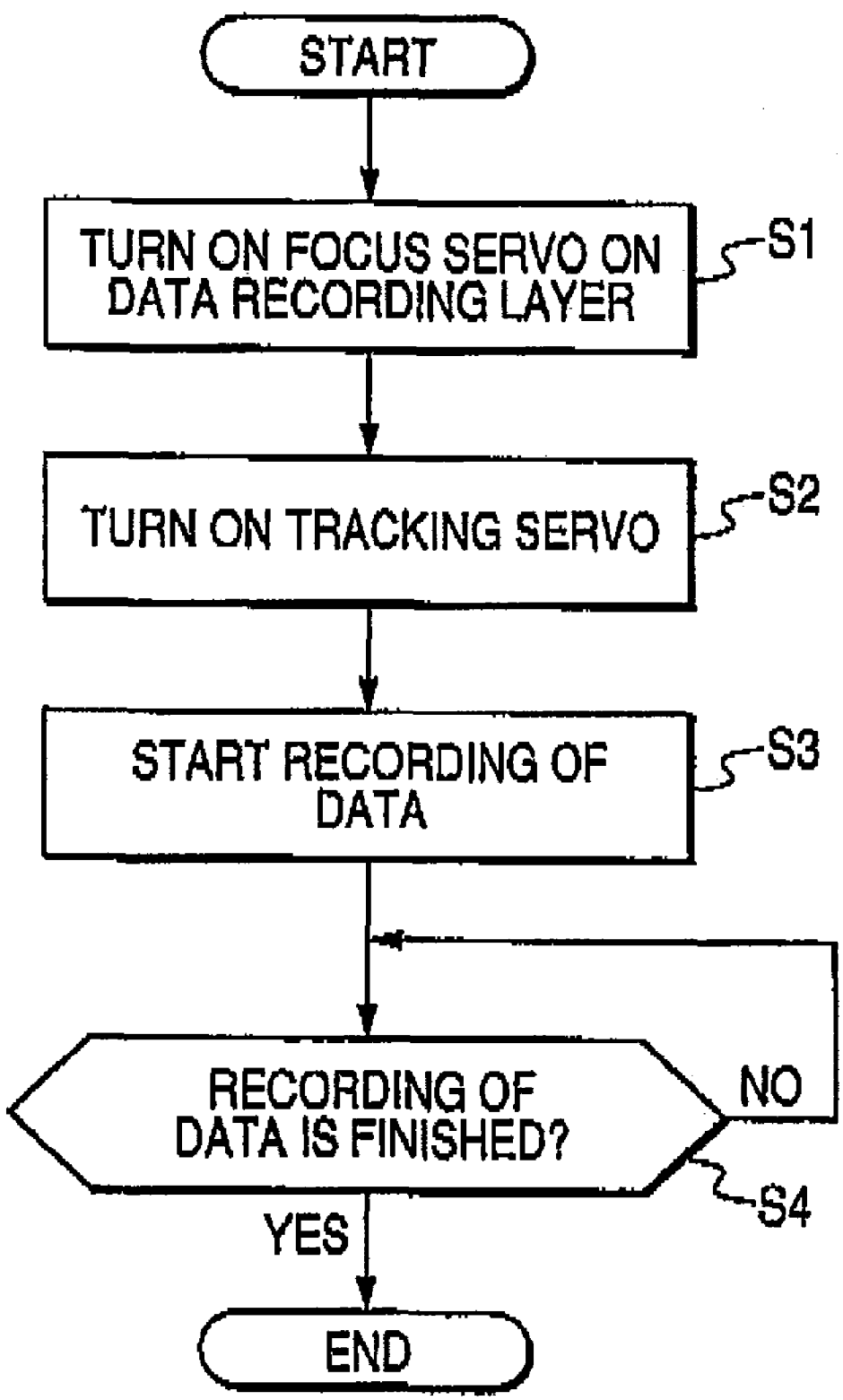
FIG. 8 is a flowchart showing a control at the time of recording data by the structure of the system shown in FIG. 1.

The control of the optical disk 12 by the optical disk device 10 shown in FIG. 1 at the time of recording the data and at the time of drawing the image will be described. It is assumed that as the optical disk 12, for instance, an optical disk having the structure shown in FIGS. 2 to 7 is used, and the data is recorded in the data recording layer A thereof and the image is drawn on the image drawing layer B. In FIG. 8, a control flow at the time of recording the data is shown. This control is performed in accordance with an instruction for recording the data by a user. In the host device 100, the recording data for recording the data is previously stored. When the optical disk 12 is inserted into the optical disk device 10 and the instruction for recording the data is supplied from the user, the spindle motor 14 is rotated and driven, the focus servo 88 is turned on and the laser beam 18 outputted from the optical pick-up 16 is controlled to focus on the data recording layer A by a reproducing power (S1). Further, the tracking servo 92 is turned on (S2) and the laser beam 18 is controlled to follow the grooves C of the data recording layer A. The spindle servo 20 controls the spindle motor 14 so that the wobble component of the grooves C extracted from a tracking error signal has a predetermined frequency. Thus, the optical disk 12 is rotation controlled to have a predetermined linear velocity at a position irradiated with the laser beam 18 to record the data (a CLV recording by a CLV control). Otherwise, the spindle motor 14 may be CAV controlled at a predetermined rotating speed to record the data (a CLV recording by a CAV control). Under a CLV controlled state or a CAV controlled state, the position information (ATIP, ADIP, land pre-pit, etc.) of the optical disk 12 is read by the optical pick-up 16 to drive the stepping motor 28 and the optical pick-up 16 is positioned at a predetermined radial position for starting the record of the data in the inner peripheral side of the disk.

As described above, when a preparation for recording the data is arranged, the host device 100 starts to transmit the recording data. The recording data is temporarily stored in the buffer memory 104 through the Interface 102, then sequentially read from the buffer memory 104 at a constant data speed corresponding to a constant linear velocity of the disk under the CLV control or at a variable data speed (data speed synchronous with a wobble signal and increased the more in an outer periphery) corresponding to a linear velocity at a recording position under the CAV control, and encoded by the encoder 106 to drive the laser driver 96 through the ALPC circuit 98. Thus, the laser beam 18 is modulated to a binary value of the reproducing power and a recording power by the recording data is outputted from the optical pick-up 16 to start to record the data on the data recording layer A of the optical disk 12 (S3). Then, when the data proceeds to be recorded and the recording of the data is completed (S4), the control is finished.

Figure 9:
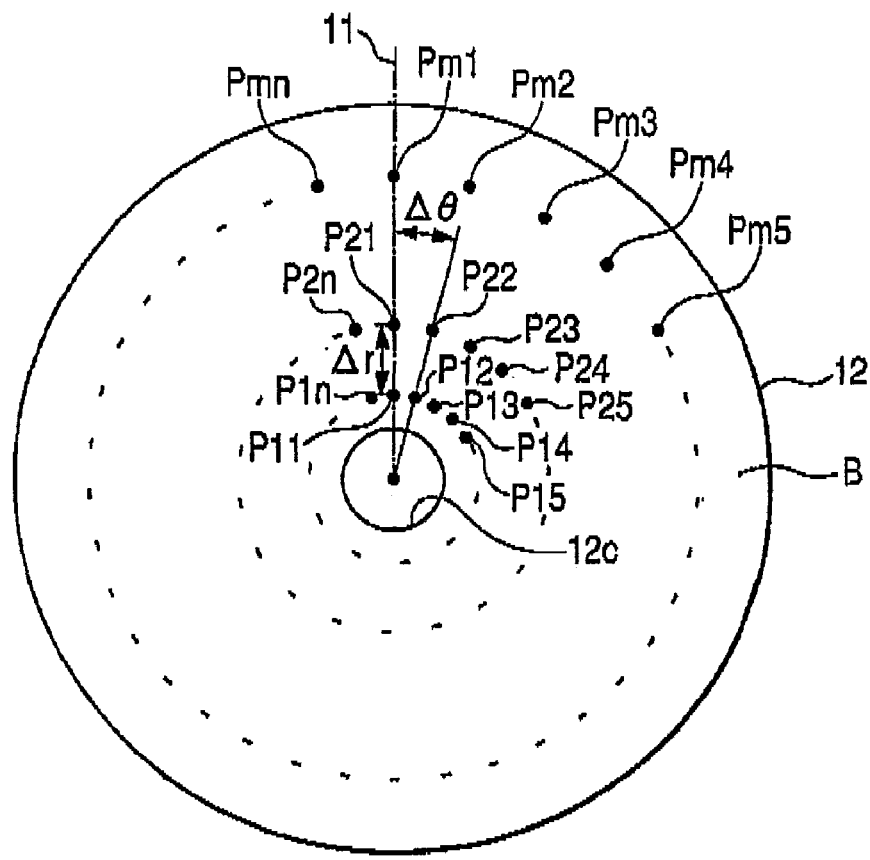
FIG. 9 is a diagram schematically showing the arrangement of pixels forming one image to be drawn on an image drawing layer B of the optical disk 12.

Now, a control at the time of drawing the image will be described. Initially, the arrangement of the pixels forming one image to be drawn on the image drawing layer B of the optical disk 12 in this embodiment is described. The arrangement of the pixels is schematically shown in FIG. 9 (considering no meandering due to the above-described vibration operation). Reference numeral 12c designates a center hole. The pixels P11, P12. . . , Pmn forming one image are concentrically arranged about the central point of the optical disk 12. A radial arrangement interval, at which the pixels are arranged, $\Delta r$ is constant. A circumferential arrangement (angular) interval $\Delta r$ is constant. Accordingly, the number of the pixels for one circumference is constant irrespective of a position of the pixel in the radial direction. A imaginary half line extending in the radial direction of the optical disk 12 is determined to be an image reference angle line 11. Pixel strings respectively arranged in circular forms in the radial positions are respectively arranged in the directions of circumference by employing an associated one of the pixels P11, P21, . . . , Pm1 on the image reference angle line 11 as first pixels. Since a front surface and a back surface are inverted between the image viewed from an image drawing side (the laser incident surface 12a side) and the image viewed from the label surface 12b side, when the drawn image is visually viewed from the label surface 12b side of the optical disk 12 (in the case of the structure of the layers of the disk shown in FIGS. 3, 5 and 6), an original image of the image to be drawn is used by inverting the front and the back thereof to draw the image in such a way that the front and the back are correctly displayed by viewing the image from a viewing side (the label surface 12b side).

An image drawing operation by the laser beam 18 is sequentially carried out from an inner peripheral side to an outer peripheral side by performing the CAV (constant rotating speed) control of the optical disk 12. Namely, the image drawing operation is started from the first pixel P11 of the pixel string in an innermost periphery and sequentially proceeds to P12, P13, . . . and when the image of the last pixel P1n in the innermost periphery is drawn, the optical pick-up 16 is immediately moved (otherwise, as described above, when the laser beam 18 is turned a plurality of times (k times) at the same radial position to draw the image, for each of k times of turns) by a distance $\Delta r$ in the outer peripheral direction to advance the image drawing operation to P12, P22, . . . . Subsequently, the image drawing operation is advanced by moving the optical pick-up 16 by the distance $\Delta r$ in the outer peripheral direction at a position immediately before the image reference angle line 11 every turn (for each of k times of turns). When the image of the last pixel Pmn in an outermost periphery is drawn, all processes are finished to complete the image drawing of the optical disk 12. As described above, since the image drawing operation is sequentially moved in the outer peripheral direction at the position immediately before the image reference angle line 11 every turn (for each of k times of turns) and continuously carried out, the image is completely drawn m times of turns (or k×m times of turns). In this case, the optical disk 12 is rotated under the CAV control and each pixel data (gradation data) is encoded {a pulse signal (an image drawing pulse) of a predetermined cycle (a cycle corresponding to an angle $\Delta\theta$ of one pixel) during which a duty is changed in accordance with the gradation data is formed} at a constant speed synchronously with the rotation of the optical disk 12 to draw the image. When only a first timing is adjusted so that the image of the first pixel P11 is drawn on the image reference angle line 11, the images of the subsequent pixels P12, P13, . . . Pmn can be automatically drawn at predetermined positions.

Figure 10:
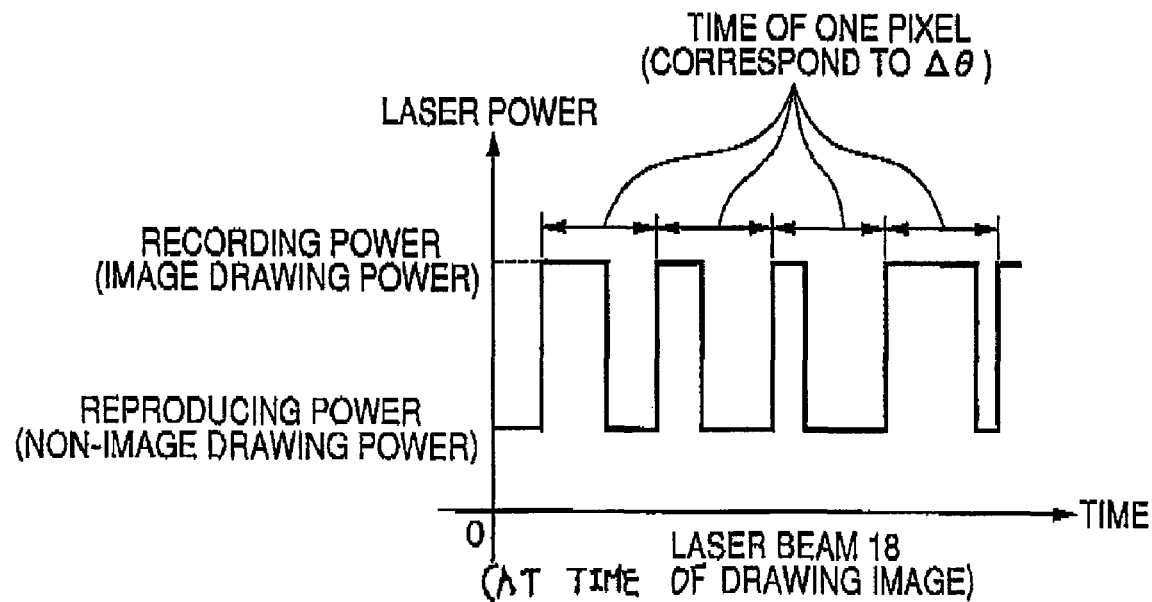
FIG. 10 is a wave form diagram showing the change of a laser power of a laser beam 18 when the image is drawn on the image drawing layer B of the optical disk 12.

At the time of drawing the image, for instance, the laser power of the laser beam 18 changes as shown in FIG. 10. Namely, the laser beam 18 is changed to the binary value of the reproducing power (a non-image drawing power) and the recording power (an image drawing power) at a duty factor which is constant during a period in which drawing period for one pixel corresponds to an angle $\Delta\theta$ for one pixel and which varies according to the tone data corresponding to each pixel. The visible light characteristics of the image drawing layer B are changed by the recording power to draw the image. Further, during the reproducing power, a focus error is detected and the focus control is carried out on the basis of the detected focus error. In FIG. 10, for the purpose of simplifying an explanation, the number of the image drawing pulses for one pixel is represented as one pulse, however, actually, as described in JP-A-2004-355764 filed by the applicant of the present invention, the image drawing pulse may be formed by an EFM signal of a shorter cycle to draw the image by a plurality of pulses for one pixel. In this case, the period of each recording power in FIG. 10 is modulated by the EFM signal (divided into short pulses). Since the average duty of the EFM signal is 50% and constant, the duty of the image drawing pulse for one pixel (a duty obtained by adding up division pulses) has a value corresponding to the gradation data of each pixel. Thus, the image drawing corresponding to the gradation data of each pixel can be realized.

Figure 11:
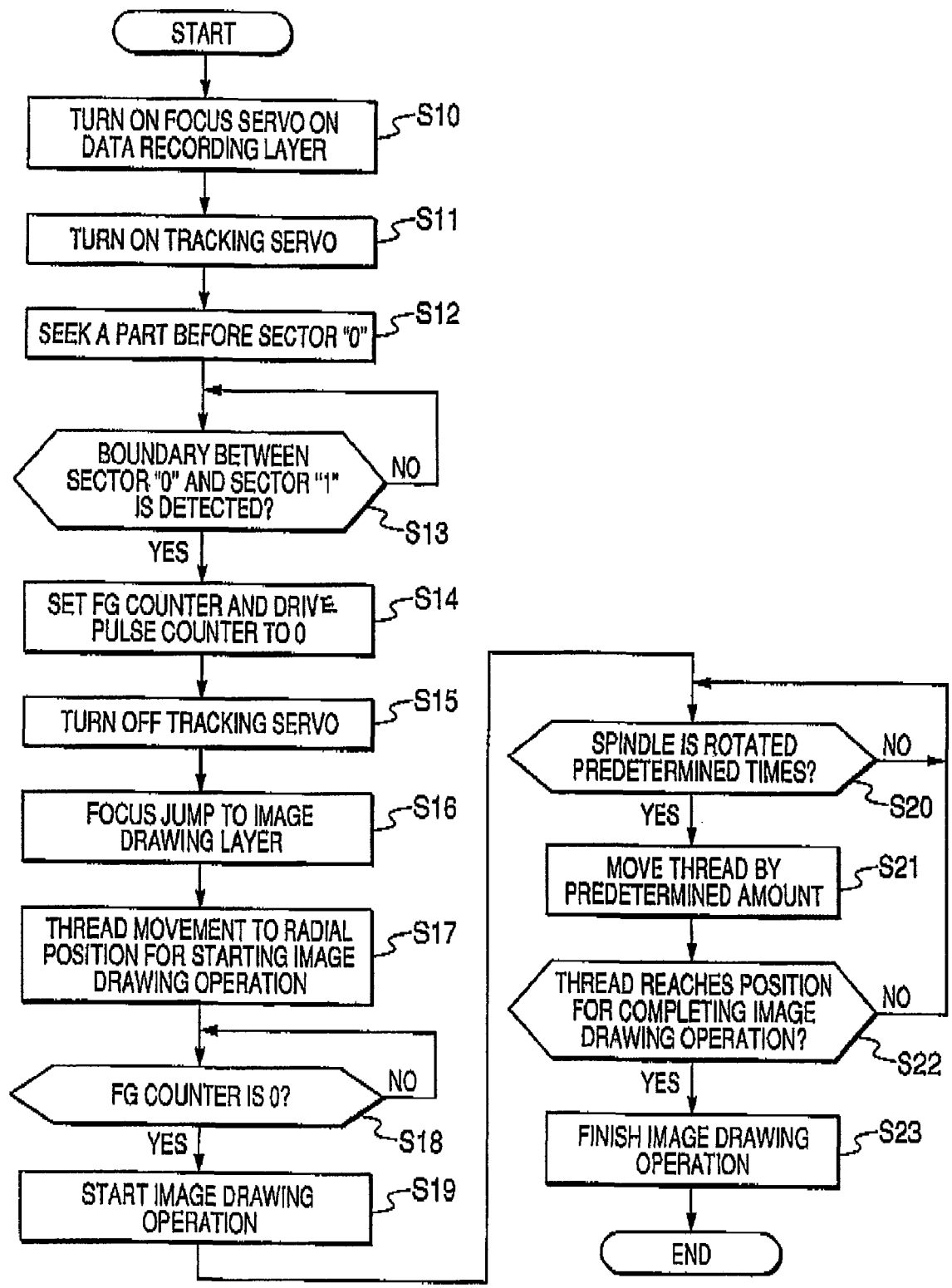
FIG. 11 is a flowchart showing a control at the time of drawing the image by the structure of the system shown in FIG. 1 in the first embodiment.

FIG. 11 shows a control flow at the time of drawing the image. This control is performed in accordance with an instruction for drawing the image by a user. In the host device 100, image data for drawing the image is previously stored. When the optical disk 12 is inserted into the optical disk device 10 (or subsequently to the completion of the recording of the data) and the instruction for drawing the image is supplied from the user, the spindle motor 14 is rotated and driven, the focus servo 88 is turned on and the laser beam 18 outputted from the optical pick-up 16 is controlled to focus on the data recording layer A of the optical disk 12 by the reproducing power (S10). Further, the tracking servo 92 is turned on (S11) and the laser beam 18 is controlled to follow the grooves C of the data recording layer A. The spindle motor 14 is rotated and driven under the CLV control or the CAV control to detect a position previously determined as a reference position from the data recording layer A by the optical pick-up 16.

Figure 12:
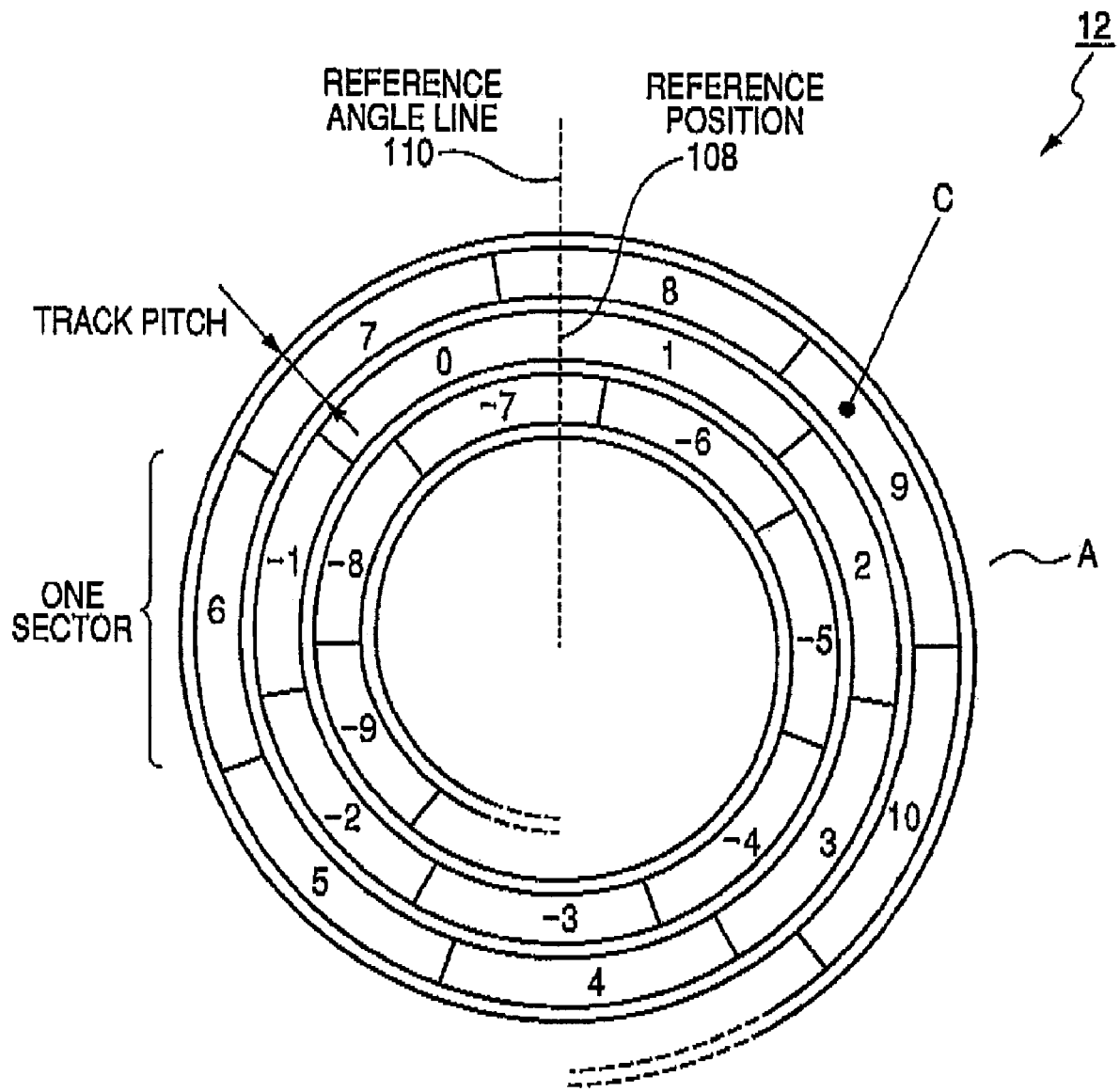
FIG. 12 is a schematic diagram showing an example for setting a reference position in the grooves C (track) of a data recording layer A of the optical disk 12.

FIG. 12 shows an example for setting the reference position. This view schematically shows position Information by an ATIP (in the case of a CD format), an ADIP (in the case of a DVD+R format), and a land pre-pit (in the case of a DVD-R format) as pre-format information recorded in the grooves C of the data recording layer A. In this example, a sector number is represented by a simple integer for convenience sake, and a boundary position of a sector "0" and a sector "1" is determined as the reference position 108. In the case of what is called a hybrid CD-R disk in which a first session is decided to be already recorded and sessions after a second session are designed to be recorded by the user, a reference position can be set by the sub-code position information of the first session in place of the position information by the ATIP. Further, in a DVD capable of recording data corresponding to the hybrid CD-R, a reference position can be set by position information by an ECC block in an already recorded data area.

An imaginary half line passing the reference position 108 and extending in the disk radial direction is determined as a reference angle line 110. The reference angle line 110 is located at the same position on the data recording layer A and the image drawing layer B as shown in FIG. 13. The image is drawn by employing the reference angle line 110 as a reference position in the rotating direction. That is, when a part before the sector "0" is sought by the optical pick-up (S12 in FIG. 11) and the boundary position of the sector "0" and the sector "1", that is, the reference position 108, is detected subsequently to the sector "0" (S13), the count value of the FG counter 24 (FIG. 1) is reset (set to "0") (S14) to start counting the FG pulse by the FG counter 24 from the reference position 108. Every time the FG counter 24 reaches a value corresponding to one turn, the count value of the FG counter 24 is automatically returned to "0" to repeat a counting operation. Thus, the count value of the FG counter 24 corresponds to the position of a rotating angle from the reference angle line 110 every turn. Namely, after the reference position 108 is detected once, the position of the rotating angle from the reference angle line 110 can be known by the count value of the FG counter 24 every turn without detecting again the reference position 108. The counting operation of the FG counter 24 is continuously carried out until the image is completely drawn. In such a way, under a state that the counting operation of the FG pulse by the FG counter 24 is repeated, the spindle motor 14 is CAV controlled to a predetermined speed determined as a speed at the time of drawing the image. The CAV control is continuously carried out unit the image drawing is completed.

Further, when the reference position 108 is detected (S13), the count value of the drive pulse counter 87 (FIG. 1) is also reset (set to "0") (S14) so that the drive pulse counter 87 starts counting the drive pulse of the stepping motor 28 from the reference position 108. Thus, the amount of movement of the optical pick-up 16 in the radial direction from the reference position 108 can be known by the count value of the drive pulse counter 87.

Figure 14:
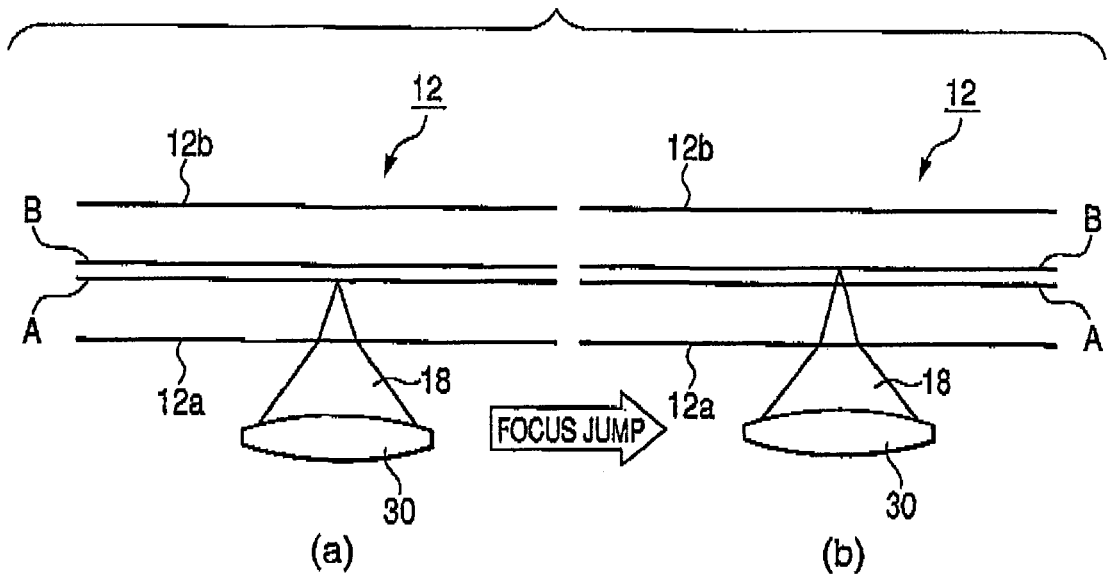
FIG. 14 is a schematic diagram showing a state of a focus jump to the image drawing layer B from the data recording layer A of the optical disk 12.

When the reference position 108 is detected, the tracking control of the optical pick-up 16 is turned off (or held) (S15) and the movement of the optical pick-up 16 by the stepping motor 28 is also stopped. Under this state, while the laser beam 18 of the optical pick-up 16 is held to the reproducing power, a focus jump signal is applied to a focus actuator of the optical pick-up 16 to move, namely, jump the focusing position of the laser bean 18 to the image drawing layer B from the data recording layer A (S16). FIG. 14 shows a state of a focus jump. This shows a case that the optical disk 12, in which the data recording layer A is arranged in a lower layer side and the image drawing layer B is arranged in an upper layer side, for instance, the DVD-R(+R) having the structure shown in FIG. 3, is used. Under a state shown in FIG. 14($a$) that the laser beam 18 is allowed to focus on the recording layer A, when the reference position 108 is detected, the laser beam 18 is jumped upward and allowed to focus on the image drawing layer B. In an optical disk of a type that the image drawing layer B is arranged in the lower layer side and the data recording layer A is arranged in the upper layer side, the focus of the laser beam 18 is conversely jumped downward.

Under the state that the laser beam 18 is controlled to focus on the image drawing layer B, the stepping motor 28 is driven to move the optical pick-up 16 to a predetermined position in the radial direction for starting an image drawing operation (S17). The position in the radial direction for starting the image drawing operation can be instructed by the amount of movement of the optical pick-up 16 in the radial direction from the reference position 108. Since the amount of movement of the optical pick-up 16 in the radial direction from the reference position 108 is measured by the count value of the drive pulse counter 87, the driving of the stepping motor 28 is stopped at a position where the count value of the drive pulse counter 87 reaches a value corresponding to the amount of movement of the optical pick-up 16 in the radial direction that is instructed as an image drawing operation start radial position, so that the optical pick-up 16 can reach the instructed position in the radial direction for starting the image drawing operation. Here, since even when the "image drawing operation" is started, a "image drawing" (the change of the visible light characteristics of the image drawing layer B) is not necessarily immediately started from that position depending on the contents of the image data, the expression of the "an image drawing operation start radial position" is employed without using a "position in the radial direction for starting the image drawing". Namely, when the density of the pixel whose image is drawn at a position where the image drawing operation is started is 0 (white), even if the "the image drawing operation" is started, the "the image drawing" for changing the visible light characteristics of the image drawing layer B is not carried out at that position. When a position first appears where the density of the pixel whose image is drawn is higher than 0, "the image drawing" is started.

As described above, when a preparation for drawing the image is arranged, the host device 100 starts to transmit the image data. The image data is temporarily stored in the buffer memory 104 through the interface 102, then sequentially read from the buffer memory 104 at a constant speed synchronous with the rotating speed of the disk and encoded by the encoder 108. At a timing when the count value of the FG counter 24 returns to "0" (that is, a timing when the laser beam 18 comes on the reference angle line 110) (S18), the encoded image data is sequentially outputted from the leading encoded image data (referring to the example shown in FIG. 9, the pixels are outputted in order of the pixels P11, P12, . . . P1n, P21, P22, . . . P2n . . . Pmn) to drive the laser driver 96 through the ALPC circuit 98. Thus, the laser beam 18 modulated to a binary value of the reproducing power (the non-image drawing power) and the recording power (the image drawing power) by the image data is outputted from the optical pick-up 16 to start the image drawing operation to the image drawing layer B of the optical disk 12 (the image drawing operation in which the number of pixels for one turn is constant irrespective of the position in the disk radial direction) (S19). When the image drawing operation is started, the stepping motor 28 is driven synchronously with the rotation of the disk (driven one step at a time every turn or every k turns (S20)) to sequentially move the optical pick-up 16 in an outer peripheral direction a predetermined micro pitch at a time (the distance Δr in FIG. 9) (S21) and advance the image drawing operation. At the time of drawing the image, the number of the drive pulses of the stepping motor 28 is continuously counted and the position of the optical pick-up 16 in the disk radial direction from the reference position 108 is continuously measured. After that, when the image drawing proceeds and the count value of the drive pulse counter 87 reaches a value corresponding to a position instructed as an image drawing operation termination radial position (the amount of movement of the optical pick-up 16 in the radial direction from the reference position 108) (S22), the image drawing operation is finished.

Figure 15:
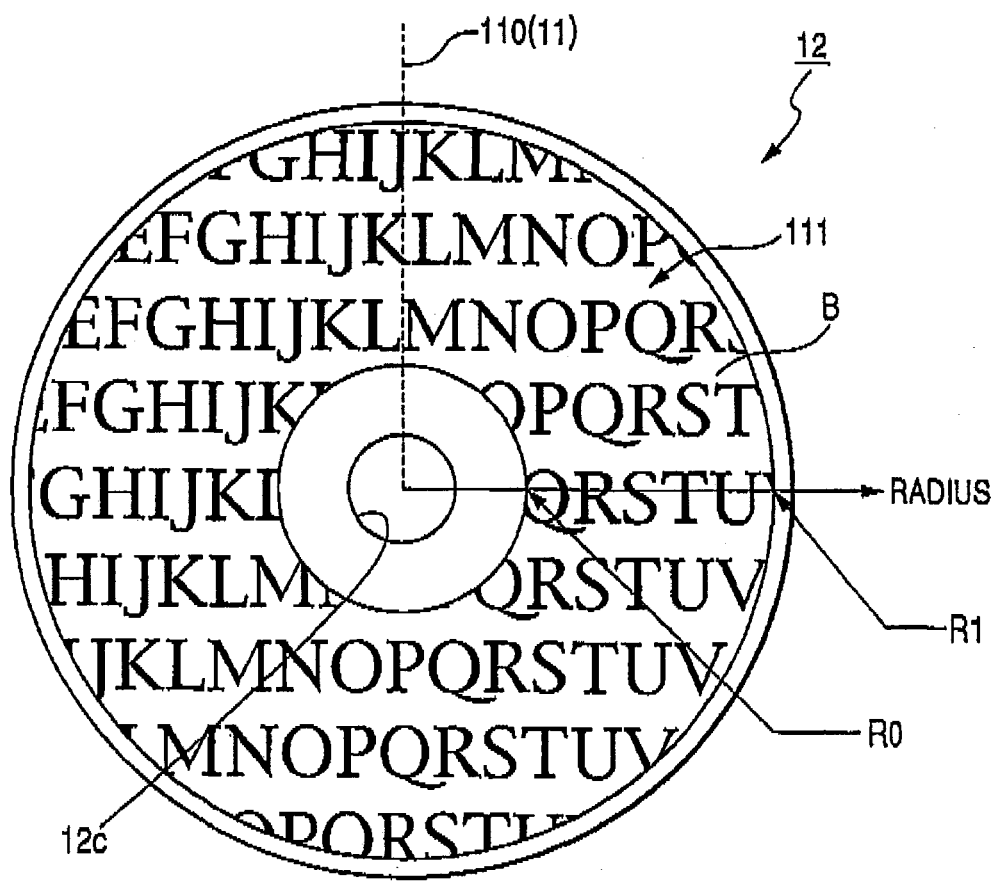
FIG. 15 is a plan view showing one example of a visible image 111 drawn on the image drawing layer B of the optical disk 12 by the control at the time of drawing the image shown in FIG. 11.

FIG. 15 shows one example of a visible image 111 drawn on the image drawing layer B of the optical disk 12 in accordance with the above-described control of the image drawing operation shown in FIG. 11. When the optical disk 12 has the structure of the layers shown in FIGS. 2, 4 and 7, the visible image 111 can be seen from the laser incident surface 12a side. When the optical disk 12 has the structure of the layers shown in FIGS. 3, 5 and 6, the visible image 111 can be seen from the label surface 12b side. In the visible image 111 shown in FIG. 15, a radius R0 designates an image drawing operation start radial position and a radius R1 designates an image drawing operation termination radial position. Reference numeral 12c designates a center hole, in the example shown in FIG. 15, the image data (the assembly of the pixel data in FIG. 9) is formed so that the orientation of the image to be drawn is adjusted to the direction of the image reference angle line 11 in FIG. 9. Further, since the image drawing operation is started by employing the timing of the reference angle line 110 measured by the FG pulse counter 24 as a reference (the image of the first pixel P11 shown in FIG. 9 is drawn on the reference angle line 110 of the optical disk 12), the visible image 111 is drawn by adjusting the direction thereof to the reference angle line 110 of the optical disk 12.

According to the first embodiment, since the front and the back of the optical disk 12 do not need to be inverted in the data recording operation and the image drawing operation, a troublesome inverting operation is not required. Further, since the inverting operation is not necessary, a time till the image drawing operation is started after the recording of the data is completed can be shortened. Further, since the reference angle line 110 is determined in accordance with the detection of the reference position 108 by the optical pick-up 16, and the image is drawn by the optical pick-up 16 by using the determined reference angle line 110 as the reference, the visible image can be formed by adjusting the direction thereof substantially to the direction of the reference angle line 110. Further, since the reference position 108 is located in the data recording layer A, a mark as a reference position may not be provided on the image drawing layer B. Accordingly, an image drawing area can be ensured wider. In the above description, the boundary position between the sector "0" and the sector "1" is set as the reference position 108, however, an arbitrary position on the grooves C of the data recording layer A can be set as the reference position.

Modified Example 1 of First Embodiment

In the first embodiment, FG counter 24 is temporarily reset at the predetermined reference position 108 (the boundary position of the sector "0" and the sector "1"), and then, the FG pulses generated after that are counted by the FG counter 24. Every time the count value reaches a value corresponding to one turn, the count value is returned to "0" to measure the position of rotating angle from the reference angle line 110 every turn. However, in this method, when the resolution of the FG pulse is low (when the number of FG pulses is small for one turn), there is a possibility that a deviation angle (an offset angle) is large between the reference angle line 110 of the data recording layer A and a position where the FG pulse is generated. Then, in the first embodiment, at the time of drawing the image, since the generating position of the FG pulse is considered to be the position of the reference angle line 110 to draw the image, the offset angle appears as a deviation of the orientation of the drawn image with respect to the direction of the reference angle line 110. Therefore, when the offset angle is large, for instance, if the optical disk 12 is ejected from the optical disk device 10 after the image is drawn on the optical disk 12, and then, the optical disk 12 is inserted again into the optical disk device 10 to additionally draw the image (additional write, overwrite), a conspicuous deviation may possibly arise in the orientation of the image between the previously formed image and the additionally formed image.

A method for reducing the deviation of the orientation of the drawn image with respect to the direction of the reference angle line 110 will be described below. This method improves the detecting resolution of the reference angle line 110 by using together the counting of the FG pulse and a counting by a counter implemented by the software of the system control portion 22. In this method, the steps S13 to S14 in the control shown in FIG. 11 are replaced by a control shown in FIG. 16 (a detecting process of the reference angle line 110), and the step S18 is replaced by a control shown in FIG. 18 (an image drawing process from the reference angle line 110). A series of control will be described below in which a part of the control shown in FIG. 11 is replaced as described above.

In FIG. 11, when the optical disk 12 is inserted into the optical disk device 10 (or subsequently to the completion of the recording of the data), the spindle motor 14 is rotated and driven, the focus servo 88 is turned on and the laser beam 18 outputted from the optical pick-up 16 is controlled to focus on the data recording layer A of the optical disk 12 by the reproducing power (S10). Further, the tracking servo 92 is turned on (S11) and the laser beam 18 is controlled to follow the grooves C of the data recording layer A. The spindle motor 14 is CAV controlled to a predetermined rotating speed determined as a speed at the time of drawing the image. The CAV control is continuously carried out until the image drawing operation is completed. Under this state, a part before the sector "0" is sought by the optical pick-up 16 to detect a position previously determined as a reference position (the boundary position of the sector "0" and the sector "1") from the data recording layer A (S12).

Figure 16:
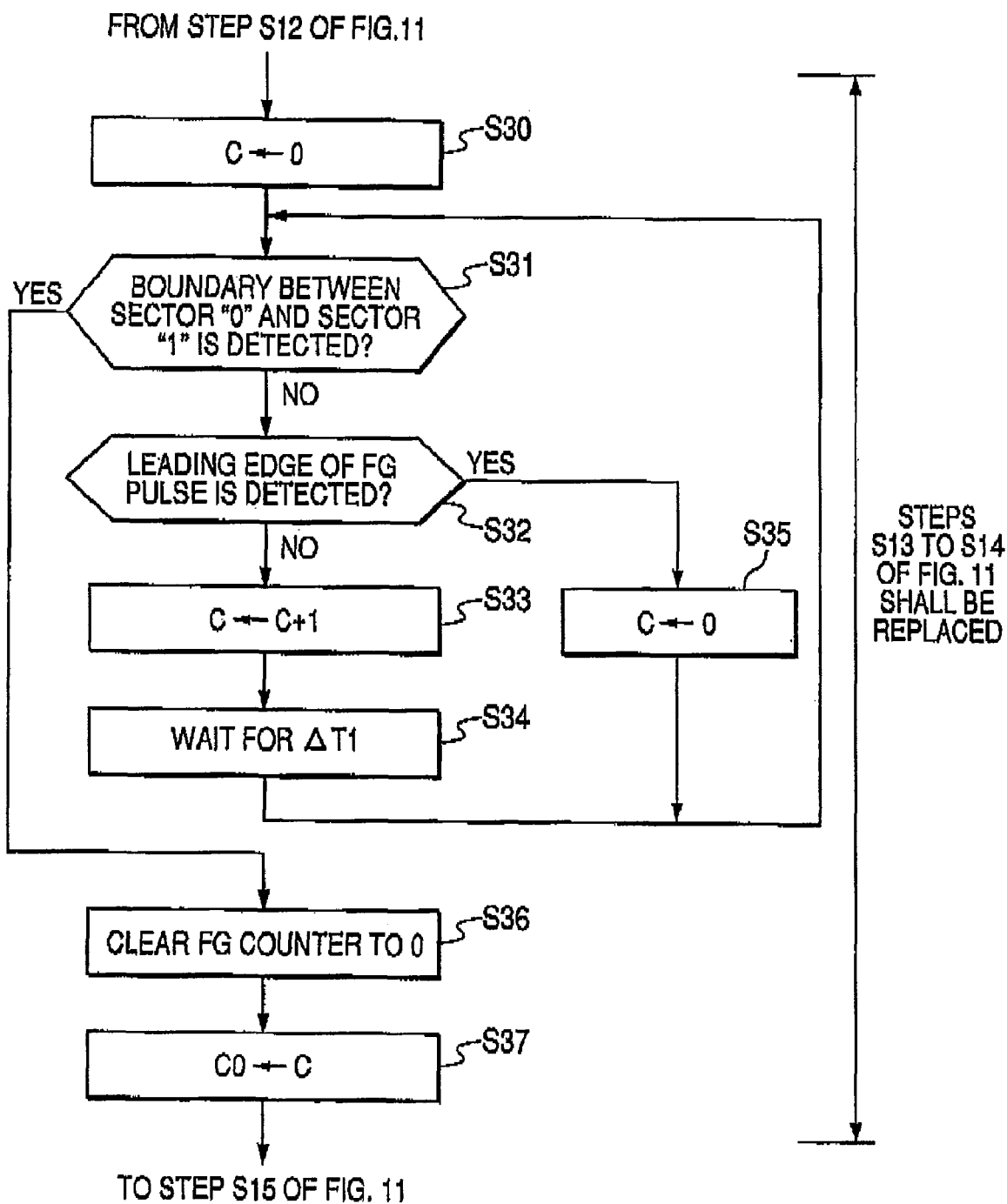
FIG. 16 is a flowchart showing a control by which steps S11 to 13 of FIG. 11 are replaced to reduce the shift of the orientation of the drawn image with respect to the direction of the reference angle line 110 in the control at the time of drawing the image shown in FIG. 11.
Figure 17:
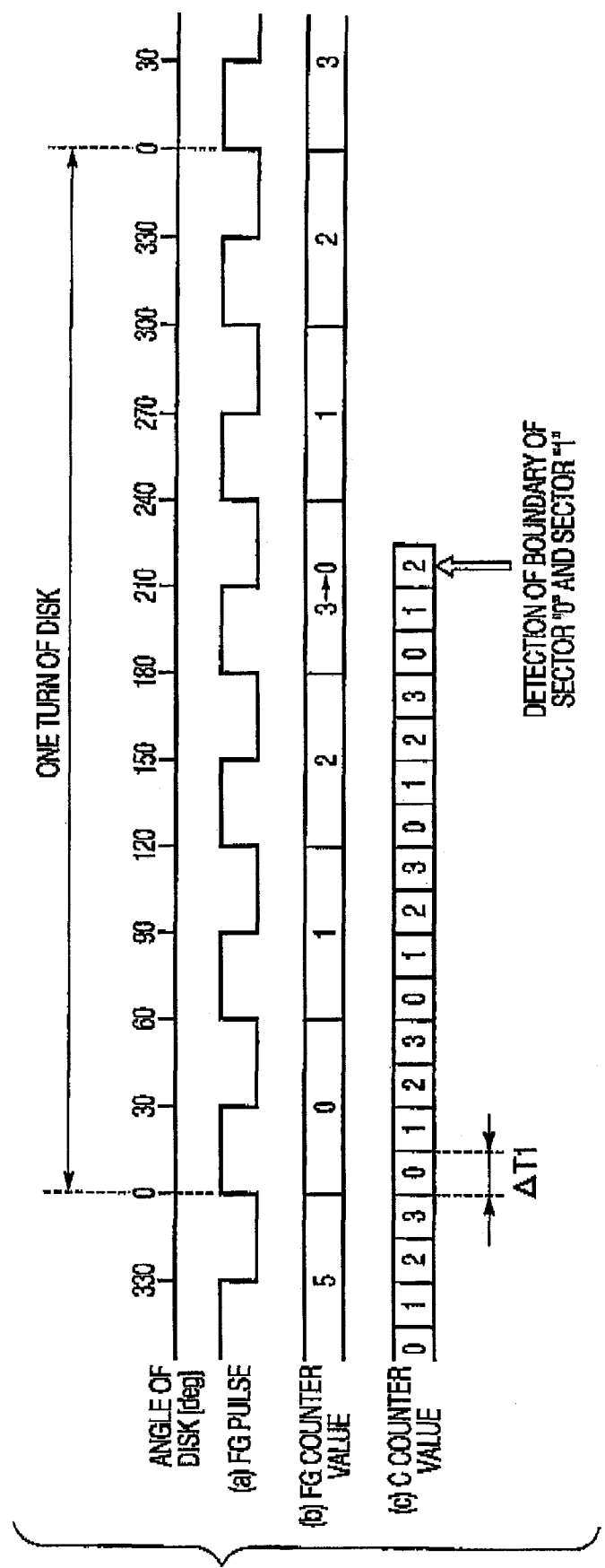
FIG. 17 is a time chart showing an operation under the control of FIG. 16.

Subsequently, the procedure of the control shifts to FIG. 16. An operational example under the control of FIG. 16 is shown in FIG. 17. In the operational example of FIG. 17, as shown in FIG. 17(a), it is assumed that the FG pulse generate six pulses for one rotation. The FG counter 24 is counted up by the leading edge of the FG pulse as shown in FIG. 17(b). FIG. 17(c) shows count values of the counter (refer it to as a "C counter") implemented by software that are counted up by a reference clock based on a crystal oscillating clock. The cycle $\Delta T1$ of the reference clock is shorter than that of the FG pulse and a plurality of pulses (in the example of FIG. 17, about four pulses) are generated in one cycle of the FG pulse. When the cycle $\Delta T1$ of the reference clock is made to be shorter, the detecting resolution of the reference angle line 110 can be the more improved.

Now, the control of FIG. 16 will be described by referring to FIG. 17. In this control flow, "C" designates the count value of the C counter. Subsequently to the step S12 of FIG. 11, the C counter is reset to an initial value (S30 in FIG. 16). The C counter is counted up for each time$\Delta T1$ by the reference clock (S33, S34) and reset to "0" (S35, see FIG. 17(c)) every time the leading edge of the FG pulse is detected (S32). When the part before the sector "0" is sought (S12 of FIG. 11) and the boundary position of the sector "0" and the sector "1", that is, the reference position 108, is detected subsequently to the sector "0" (S31 in FIG. 16), the FG counter 24 is reset to "0" (S36) and the count value C of the C counter at that time (in the example of FIG. 17(c), C=2) is stored in a memory of the system control portion 22 as an offset value C0 of the reference position 108 from the leading edge of the FG pulse immediately before the reference position (S37). Subsequently, while the rotation of the disk is CAV controlled to a predetermined rotating speed determined as a speed at the time of drawing the image, the count of the FG pulse by the FG counter 24 (the count value is automatically returned to "0" every time the count value reaches a value corresponding to one turn) and the count of the reference clock by the C counter are continuously carried out. Thus, timing when the count value of the FG counter 24 is "0" and the count value of the C counter is C0 is detected as a timing of the reference angle line 110 for each turn. The detection of the timing of the reference angle line 110 for each turn by the FG counter 24 and the C counter is continuously performed until the image drawing operation is completed. In such a way, under a state that the timing of the reference angle line 110 is continuously detected, the procedure of the control shifts to the step S15 of FIG. 11.

In the step S15 of FIG. 11, the tracking control of the optical pick-up 16 is turned off (or held) and the movement of the optical pick-up 16 by the stepping motor 28 is also stopped. Under this state, while the laser beam 18 of the optical pick-up 16 is held to the reproducing power, a focus jump signal is applied to a focus actuator of the optical pick-up 16 to move, namely, jump the focusing position of the optical pick-up 16 to the image drawing layer B from the data recording layer A (S16). Then, under the state that the laser beam 18 is controlled to focus on the image drawing layer B, the stepping motor 28 is driven to move the optical pick-up 16 to a predetermined image drawing operation start radial position (S17). The arrival of the optical pick-up 16 at the predetermined image drawing operation start radial position can be known by the count value of the drive pulse counter 87 (FIG. 1).

Figure 18:
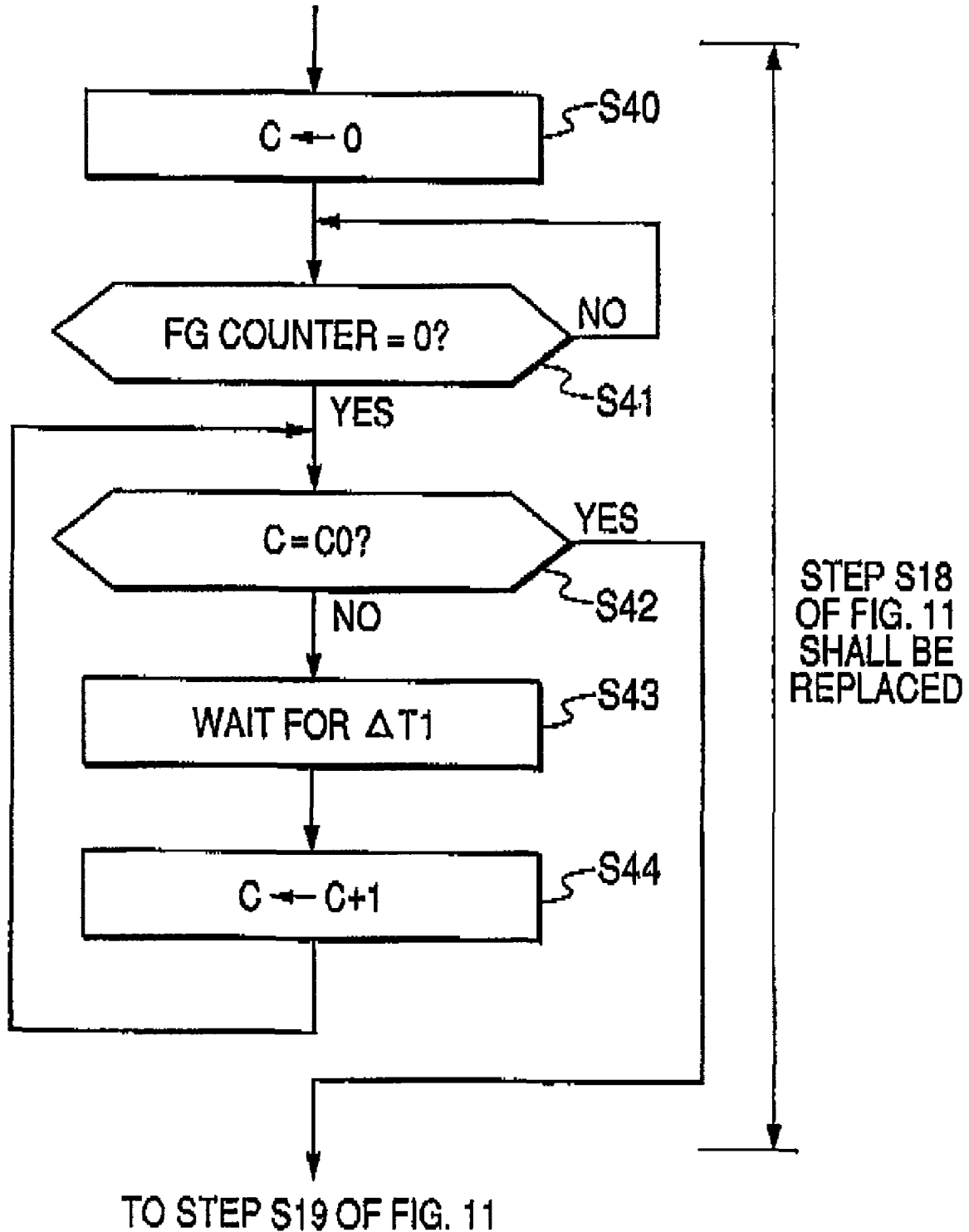
FIG. 18 is a flowchart showing a control by which a step S18 in FIG. 11 is replaced to reduce the shift of the orientation of the drawn image with respect to the direction of the reference angle line 110 in the control at the time of drawing the image shown in FIG. 11.
Figure 19:
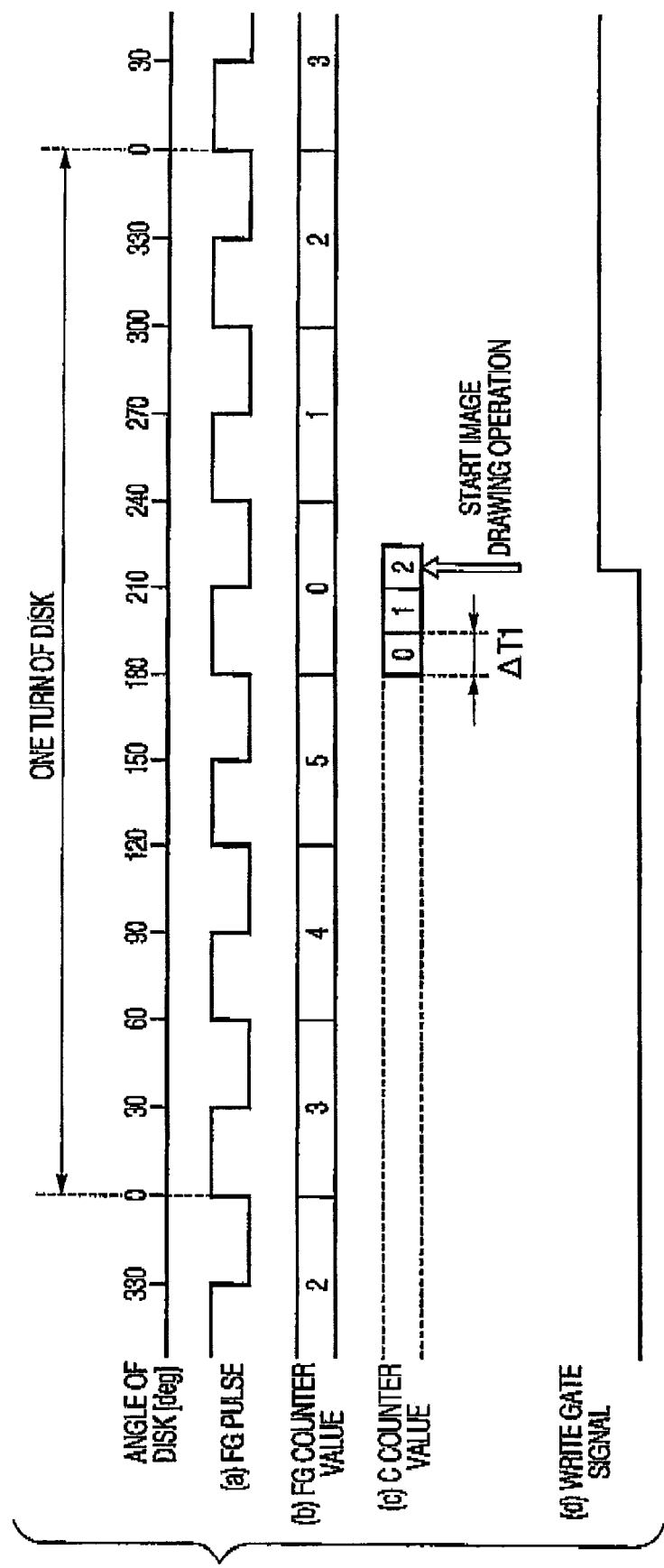
FIG. 19 is a time chart showing an operation under the control of FIG. 18.

Subsequently, the procedure of the control shifts to FIG. 18. An operational example under the control of FIG. 18 is shown in FIG. 19. The control of FIG. 18 is described by referring to FIG. 19. In the step S17 of FIG. 11, when the optical pick-up 16 reaches the image drawing operation start radial position, the C counter is reset to an initial value (S40 in FIG. 18). The C counter is counted up for each time$\Delta T1$ by the reference clock and reset to "0" every time the leading edge of the FG pulse is detected. After the count value of the FG counter 24 is reset to "0" in the step S36 in the detecting process of the reference angle line 110 in FIG. 16, the count value is automatically returned to "0" every time the count value of the FG counter 24 reaches a value corresponding to one turn to repeat the count of the FG pulse.

At a timing when the FG counter is returned to "0" (S41), the C counter is counted up for each time$\Delta T1$ by the reference clock (S43, S44) and the count value of the C counter reaches the offset value C0 stored in the memory, a WRITE GATE signal is outputted as shown in FIG. 19(d), and the procedure shifts to the step S19 of FIG. 11 to start the image drawing operation. As described above, since the timing when the count value of the FG counter 24 is "0" and the count value of the C counter is C0 corresponds to the timing of the reference angle line 110 for each turn, the image drawing operation is accurately started from the position of the reference angle line 110. Accordingly, when the optical disk 12 is ejected from the optical disk device 10 after the image is drawn on the optical disk 12, and then, the optical disk 12 is inserted again into the optical disk device 10 to additionally draw the image (additional write, overwrite), the image can be additionally drawn without generating a conspicuous deviation in the orientation of the image between the previously formed image and the additionally formed image. After that, the control of the steps S20 to S23 in FIG. 11 is carried out to complete the image drawing.

Modified Example 2 of First Embodiment

In the modified example 1, the count of the FG pulse and the count of the reference clock are used together to improve the detecting resolution of the reference angle line. However, a frequency multiplied pulse of the FG pulse may be used in place of the count of the reference clock, in this case, as shown by a dotted line in FIG. 1, a multiplier 113 frequency multiplies the FG pulse outputted from the spindle motor 14 by a predetermined multiple and a multiplied-FG-pulse counter 115 counts the frequency-multiplied FG pulse. The multiplied-FG-pulse counter 115 is used in the same manner as that of the C counter in the modified example 1 (see FIGS. 16 to 19). Namely, in the detecting process of the reference angle line 110 in FIG. 16, the count value of the multiplied-FG-pulse counter 115 is counted up according to the multiplied FG pulse and reset to "0" every time the leading edge of the FG pulse is detected (see the operation of the C counter in FIG. 17(c)). When the reference position 108 (FIG. 12) is detected, the count value of the FG counter 24 is reset to "0" and the count value of the multiplied FG counter 115 at that time (referring to the example of FIG. 17(c), C=2) is stored in the memory of the system control portion 22 as an offset value of the reference position 108 from the leading edge of the FG pulse immediately before the reference position.

In the image drawing process from the reference angle line 110 in FIG. 18, the count value of the multiplied-FG-pulse counter 115 is sequentially counted up according to the multiplied FG pulse and is reset to "0" every time the leading edge of the FG pulse is detected. After the count value of the FG counter 24 is reset to "0" at the reference position 108 in the detecting process of the reference angle line 110, the count value is automatically returned to "0" every time the count value of the FG counter 24 reaches a value corresponding to one turn to repeat the count of the FG pulse. Since a timing when the FG counter 24 is returned to "0", and when the count value of the multiplied-FG-pulse counter 115 reaches the offset value stored in the memory (referring to the example in FIG. 19(c), a timing of C=2) corresponds to the timing of the reference angle line 110 for each turn, the WRITE GATE signal (see FIG. 19(d)) is outputted at this timing to start the image drawing operation. Thus, the image drawing operation is accurately started from the position of the reference angle line 110.

Second Embodiment: Embodiment of Fourth Optical Disk Image Drawing Method

Figure 20:
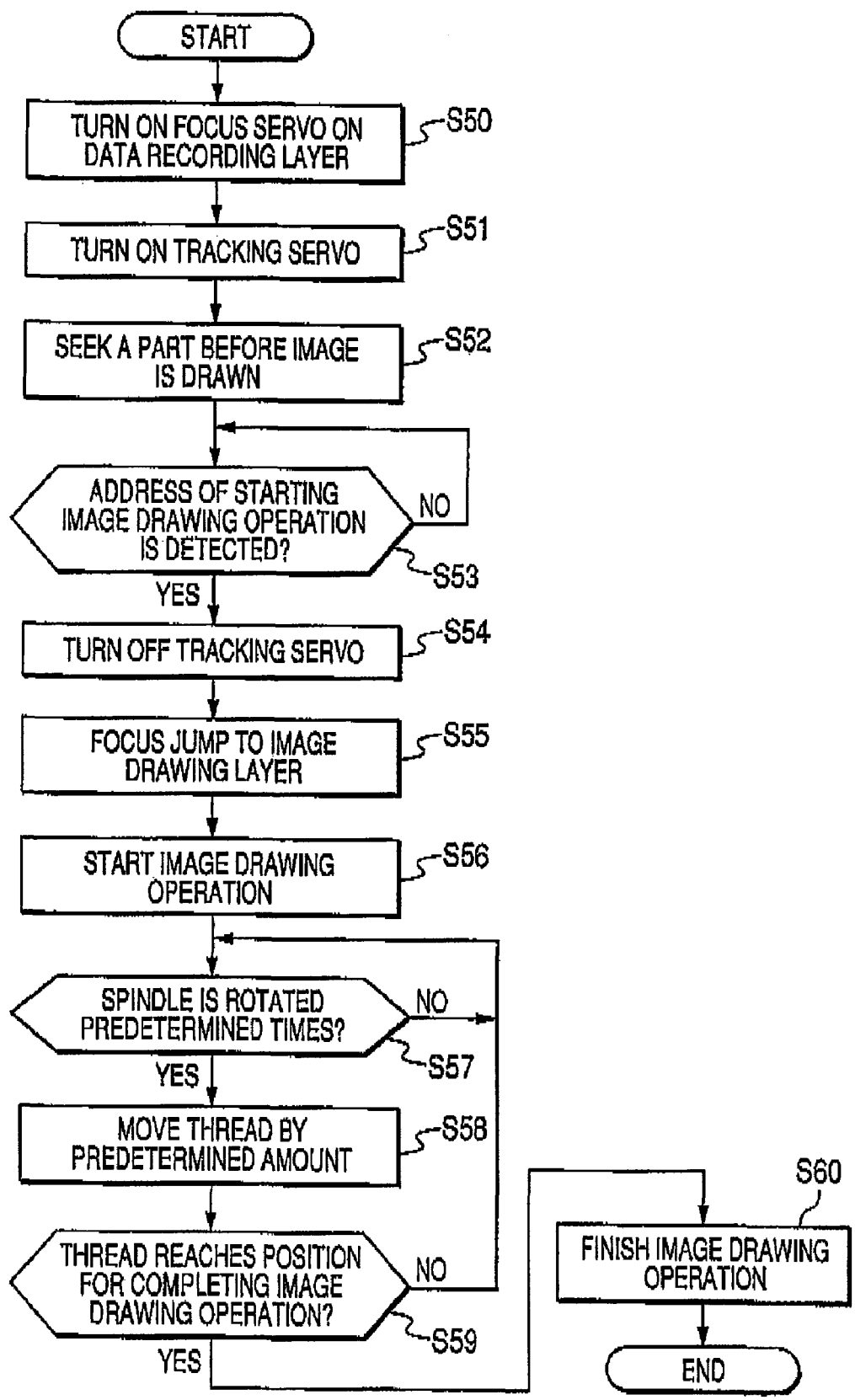
FIG. 20 is a flowchart showing a control at the time of drawing an image by the structure of the system of FIG. 1 according to a second embodiment.

A second embodiment of the present invention will be described. As the structure of a system, the above-described structure shown in FIG. 1 can be used as it is. A control at the time of drawing an image according to the second embodiment is shown in FIG. 20. This control is performed in accordance with an instruction for drawing the image by a user. In a host device 100, image data for drawing the image is previously stored. The image data has pixels respectively arranged as shown in FIG. 9. When an optical disk 12 is inserted into an optical disk device 10 (or subsequently to the completion of the recording of the data) and the instruction for drawing the image is supplied from the user, a spindle motor 14 is rotated and driven, a focus servo 88 is turned on and a laser beam 18 outputted from an optical pick-up 16 is controlled to focus on a data recording layer A of the optical disk 12 by a reproducing power (S50). Further, a tracking servo 92 is turned on (S51) and the laser beam 18 is controlled to follow the grooves C of the data recording layer A. The spindle motor 14 is CAV controlled to a predetermined rotating speed determined as a speed at the time of drawing the image. This CAV control is continuously carried out until an image drawing operation is completed.

Subsequently, a part before an address instructed as a position for starting the image drawing operation is sought by detecting pre-format information such as an ATIP, an ADIP or the like (S52). Then, when the address for starting the image drawing operation is detected (S53), the tracking control of the optical pick-up 16 is turned off (or held) (S54). The count value of a drive pulse counter 87 is reset to "0". Under this state, a focus jump signal is applied to a focus actuator of the optical pick-up 16 to move, namely, jump the focusing position of the laser beam 18 to an image drawing layer B from the data recording layer A (S55) to start the image drawing operation from the position (S56). Namely, the image data transmitted from the host device 100 is temporarily stored in a buffer memory 104 through an interface 102, then sequentially read from the buffer memory 104 at a constant speed synchronous with the rotating speed of the disk and encoded by an encoder 106, and the read image data is sequentially outputted from the first image data (referring to the example shown in FIG. 9, the pixels are outputted in order of the pixels P11, P12, ... P1n, P21, P22, ... P2n, ... Pmn) to drive a laser driver 96 through an ALPC circuit 98. Thus, the laser beam 18 modulated to a binary value of a reproducing power (a non-image drawing power) and a recording power (an image drawing power) by the image data is outputted from the optical pick-up 16 to start the image drawing operation to the image drawing layer B of the optical disk 12 (the image drawing operation in which the number of pixels for one turn is constant irrespective of a position in the disk radial direction).

When the image drawing operation is started, a stepping motor 28 is driven synchronously with the rotation of the disk one step at a time every turn or every k turns to sequentially move the optical pick-up 16 in an outer peripheral direction by a predetermined micro pitch (the distance Δr in FIG. 9) and advance the image drawing operation (S57, S58). When the count value of the drive pulse counter 87 reaches a value corresponding to a position instructed as an image drawing operation termination radial position (S59), the image drawing operation is finished (S60).

According to the second embodiment, since the front and the back of the optical disk 12 do not need to be inverted to record the data and draw the image, a troublesome inverting operation is not necessary. Further, since the inverting operation is not necessary, a time until the image drawing operation is started after the data is recorded can be shortened.

Third Embodiment: Embodiment of Fifth Optical Disk Image Drawing Method

A third embodiment of the present invention will be described below. In this method, an address on the grooves C of a data recording layer A is detected and an optical pick-up is sequentially moved at a track pitch (0.74 μm in the case of a DVD, and 1.6 μm in the case of a CD) in the radial direction of a disk to draw an image at the track pitch. According to this method, for instance, an imaginary half line extending in the radial direction of the optical disk (for instance, the above-described reference angle line 110 of FIG. 12) is assumed, and an address at a position where the groove C of the data recording layer A intersects the imaginary half line for each turn (an address by pre-format information such as ATIP, ADIP or the like, refer it to as an "address on a reference angle line") is previously obtained (obtained based on the linear velocity and the track pitch of the optical disk) and stored in a memory. The addresses on the reference angle line are sequentially detected on the data recording layer A, and a tracking control is held to jump a focus to an image drawing layer B every time the address on the reference angle line is detected, so that an image can be drawn for each corresponding position in the radial direction. As the structure of a system, the above-described structure shown in FIG. 1 can be used as it is. However, as a feeding motor of the optical pick-up 16, an inexpensive DC motor may be used in place of the stepping motor 28 to reduce a cost.

A control at the time of drawing an image according to the third embodiment is shown in FIG. 20. This control is performed in accordance with an instruction for drawing the image by a user. In a host device 100, image data for drawing the image is previously stored. The image data has pixels respectively arranged as shown in FIG. 9 (in this case, Δr=track pitch). The image data in each radial position is started from a position on the imaginary half line extending in the disk radial direction (for instance, the above-described image reference angle line 11 shown in FIG. 9). Further, it is assumed that the address on the reference angle line for each track pitch is previously calculated and stored in a system control portion 22 of an optical disk device 10.

When the optical disk 12 is inserted into the optical disk device 10 (or subsequently to the completion of the recording of the data), a spindle motor 14 is CAV controlled to a predetermined rotating speed determined as a speed at the time of drawing the image. The CAV control is carried out until an image drawing operation is finished. Then, a focus servo 88 is turned on (S60) and a laser beam 18 outputted from the optical pick-up 16 is controlled to focus on the data recording layer A of the optical disk 12 by a reproducing power. Further, a tracking servo 92 is turned on (S61) and the laser beam 18 is controlled to follow the grooves C of the data recording layer A. Under this state, a part before the address on the reference angle line at an image drawing operation start radial position is sought by the optical pick-up 16 (S62).

When the address on the reference angle line at the image drawing operation start radial position is detected (S63), the tracking control of the optical pick-up 16 is held and the movement of the optical pick-up 16 by the stepping motor 28 is also stopped (S64). Under this state, while the laser beam 18 of the optical pick-up 15 is maintained to a reproducing power, a focus jump signal is applied to a focus actuator of the optical pick-up 16 to move, namely, jump the focusing position of the laser beam 18 to the image drawing layer B from the data recording layer A (S65). When the focusing position of the laser beam is jumped to the image drawing layer B, the image drawing operation is started from a predetermined position in the rotating direction detected by an FG counter 24 (S66). Namely, image data transmitted from a host device 100 is temporarily stored in a buffer memory 104 through an interface 102, then sequentially read from the buffer memory 104 at a constant speed synchronous with the rotating speed of the disk and encoded by an encoder 106. The image data at the an image drawing operation start radial position is sequentially outputted from the first image data (referring to the example shown in FIG. 9, the pixels are outputted in order of the pixels P11, P12, . . . P1n) to drive a laser driver 96 through an ALPC circuit 98. Thus, the laser beam 18 modulated to a binary value of a reproducing power (a non-image drawing power) and a recording power (an image drawing power) by the image data is outputted from the optical pick-up 16 to perform the image drawing operation at the an image drawing operation start radial position on the image drawing layer B of the optical disk 12. Then, when the spindle motor 14 rotates number of times determined as the number of turns for drawing the image at the same position in the radial direction (S67), the image drawing is finished at the image drawing operation start radial position (S68) and the laser beam 18 is returned to the reproducing power.

Subsequently, the holding state of the tracking control is released (S70) to apply a focus jump signal in an opposite direction to that of the last time to the focus actuator of the optical pick-up 16 and jump the focusing position of the laser beam 18 to the data recording layer A from the image drawing layer B (S71). Then, the tracking control is turned on (S61) to seek a part before an address of a next track (a track adjacent to an outer peripheral side of the image drawing operation start radial position) on the reference angle line (S62). When the corresponding address on the reference angle line is detected (S63), the tracking control of the optical pick-up 16 is held at that position and the movement of the optical pick-up 16 by the stepping motor 28 is also stopped (S64). Under this state, while the laser beam 18 of the optical pick-up 16 is held to the reproducing power, a focus jump signal is applied to the focus actuator of the optical pick-up 16 to move, namely, jump the focusing position of the laser beam 18 to the image drawing layer B from the data recording layer A (S65). When the focusing position of the laser beam is jumped to the image drawing layer B, the image data at the position in the disk radial direction is sequentially outputted from the first image data (referring to the example shown in FIG. 9, the pixels are outputted in order of the pixels P21, P22, . . . P2n) to sequentially draw the image from the predetermined position in the rotating direction detected by the FG counter 24 (S66, S67).

A series of processes are repeated including operations that the optical pick-up 16 is positioned in the radial direction by reading the position information of the data layer A, the tracking control is held to jump the focus to the image drawing layer B, the image is drawn in the radial direction and the focus is jumped to the data recording layer A. Accordingly, the image drawing operation sequentially advances in the outer peripheral direction at the track pitch Then, when the image drawing at the last radial direction is finished (S69), the image drawing operation is finished.

Figure 22:
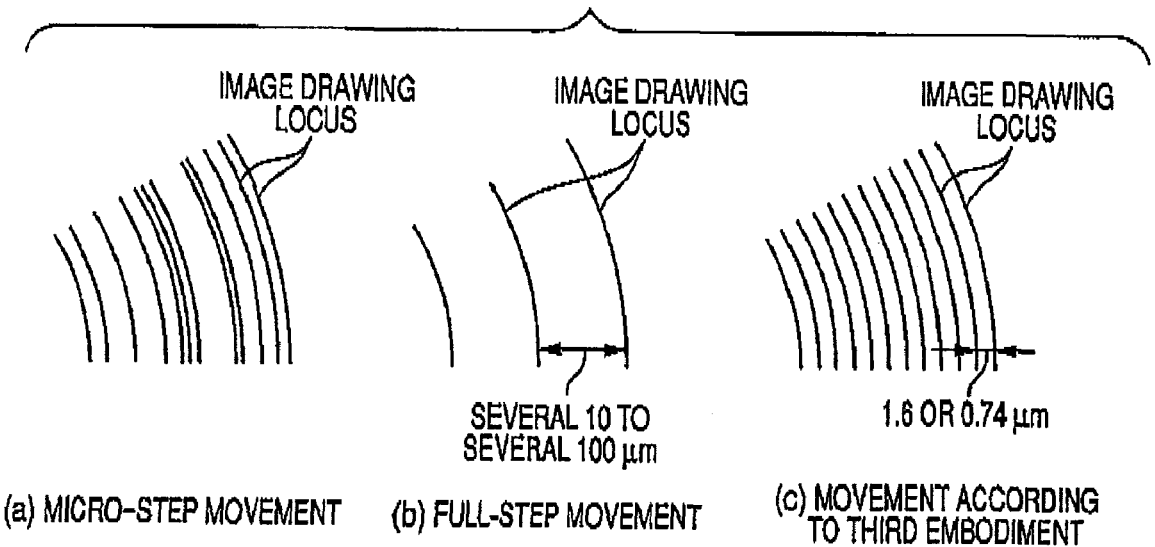
FIG. 22 shows a difference between a locus formed by drawing the image by a laser beam 18 at the time of drawing the image according to an Image drawing method of the third embodiment and that by other method and is a plan view showing a part of the area of an image drawing layer.

FIG. 22 shows a difference between loci formed by drawing the image on the image drawing layer by the laser beam 18 at the time of drawing the image according to the above-described image drawing method of the third embodiment and loci formed by other method. FIG. 22(*a*) shows the loci formed by drawing the image when the stepping motor 28 is micro-step driven to move the optical pick-up to draw the image, and an interval of the loci formed by drawing the image is varied due to an unevenness in the motor itself or a control circuit of the motor. Such a variation of the interval of the loci obtained by drawing the image generates unevenness in the formed image. FIG. 22(*b*) shows the loci formed by drawing the image when the stepping motor is full-step driven to move the optical pick-up to draw the image. Ordinarily, since an amount of movement of one full-step is large (several 10 to several 100 μm or so), the space of the locus formed by drawing the image is wide to obtain a rough image, FIG. 22(*c*) shows the loci formed by drawing the image according to the third embodiment. According to this method, since the loci formed by drawing the image has a narrow interval (1.6 μm or 0.74 μm) the same as that of the track pitch and is uniform, a fine and clear image can be drawn without unevenness.

According to the third embodiment, since the front and the back of the optical disk 12 do not need to be inverted to record the data and draw the image, a troublesome inverting operation is not necessary. Further, since the inverting operation is not necessary, a time until the image drawing operation is started after the data is recorded can be shortened.

Figure 21:
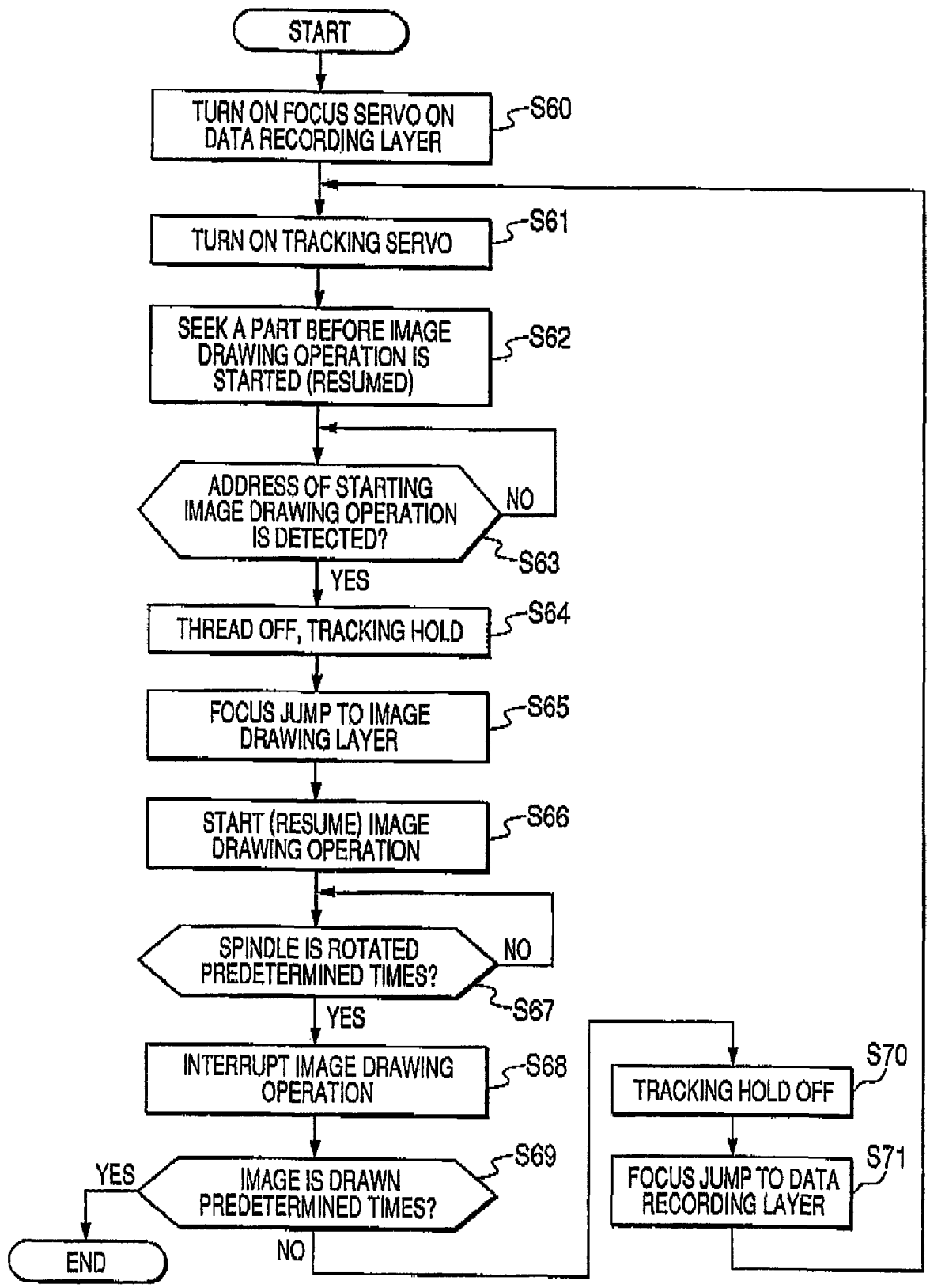
FIG. 21 is a flowchart showing a control at the time of drawing an image by the structure of the system of FIG. 1 according to a third embodiment.

In the third embodiment, when a visible image to be drawn has an area in the disk radial direction where the image does not need to be drawn in an intermediate position in the disk radial direction, the position in the radial direction can be skipped. That is, when the image drawing of a position in the disk radial direction immediately before the area in the disk radial direction where the image does not need to be drawn is finished (S68 of FIG. 21), the laser beam 18 is returned to the reproducing power, the holding state of the tracking control is released (S70) and the focusing position of the laser beam 18 is jumped to the data recording layer A from the image drawing layer (S71). Then, the tracking control is turned on (S61) to seek a part before an address of a track on the reference angle line at a position passing the area in the disk radial direction where the image does not need to be drawn (S62). When the corresponding address on the reference angle line is detected (S63), the tracking control of the optical pick-up 16 is held and the movement of the optical pick-up 16 by the stepping motor 28 is also stopped (S64). Under this state, while the laser beam 18 of the optical pick-up 16 is held to the reproducing power, the focus jump signal is applied to the focus actuator of the optical pick-up 16 to jump the focusing position of the laser beam 18 to the image drawing layer B from the data recording layer A (S65). When the focusing position of the laser beam is jumped to the image drawing layer B, the image data at the position in the disk radial direction is sequentially outputted from the first data thereof and the image is sequentially drawn from the predetermined position in the rotating direction detected by the FG counter 24 (S66, S67). In such a way, the area in the disk radial direction where the image does not need to be drawn is skipped to draw image, so that a time required for drawing image can be shortened.

Figure 23:
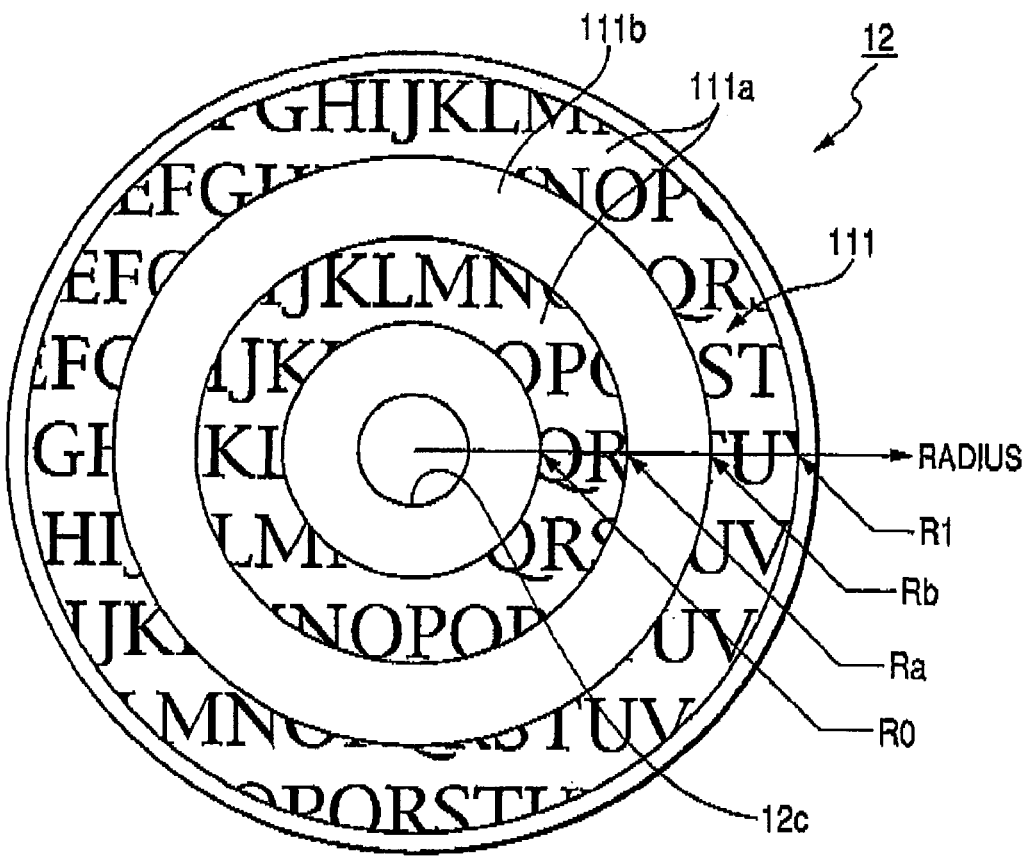
FIG. 23 is a plan view showing one example of a visible image 111 drawn by skipping an area in the radial direction of a disk where the image does not need to be drawn in the third embodiment.

FIG. 23 shows an example of the visible image 111 drawn as described above in the third embodiment by skipping the area in the disk radial direction where the image does not need to be drawn. The visible image 111 has radiuses R0 to R1 and the image to be drawn is included in all the areas thereof. The areas of the radiuses R0 to Ra and Rb to R1 designate areas 111a where the image to be drawn is present and the image needs to be drawn. The area of the radius Ra to Rb designates an area 111b where the image to be drawn is not present and the image does not need to be drawn. Reference numeral 12c designates a center hole. The image drawing operation is started at the radius R0 and temporarily interrupted at the radius Ra, the radius Ra to Rb is skipped, and the image drawing operation is resumed at the radius Rb and finished at the radius R1.

<Judging Method 1 for Disk Capable of Drawing Image>

When the image is to be drawn on the surface of the optical disk, whether or not the optical disk on which the image is to be drawn is a disk capable of drawing the image needs to be previously judged. Examples of judging methods will be described below. In this method, when identifying information showing that the optical disk is the disk on which the image can be drawn (disk identifying information of allowing the image drawing) is newly defined to record data on the data recording layer A of the optical disk 12 and the optical disk is inserted into the optical disk device 10 (FIG. 1), it is judged whether or not the inserted optical disk is a disk on which the image can be drawn depending on whether or not the disk identifying information of allowing the image drawing can be read by the optical pick-up 16.

(Definition Example 1 of Disk Identifying Information of Allowing the Image Drawing in CD Format)

When the data recording layer A is formed by a CD format, the disk identifying information of allowing the image drawing can be recorded by using the undefined code of an ATIP. FIG. 24 shows the structure of the data of the ATIP. In this data structure, it is assumed that "U1" is "1" and the disk identifying information of allowing the image drawing can be put in "U2 to U7". For instance, "U1 to U7"="1010101," can be defined as the disk identifying information of allowing the image drawing.

(Definition Example 2 of Disk Identifying Information of Allowing Image Drawing in CD Format)

For instance, in the case of what is called a hybrid CD-R disk in which a first session is already recorded and parts after a second session can be recorded by a user, the undefined codes of sub-codes R to W of the first session are used to record the disk identifying information of allowing the image drawing. FIG. 25 shows the data structure of the sub-codes. In this data structure, when "MODE"="111" and "ITEM"="000", the sub-codes R to W show a user mode so that the user can freely define "INSTRUCTION" and "DATA field". Thus, for instance, a case that "INSTRUCTION"="010101", and "DATA field" shows a pattern illustrated in FIG. 26 can be defined as the disk identifying information of allowing the image drawing.

(Definition Example 3 of Disk Identifying Information of Allowing Image Drawing in CD Format)

Figures 26, 27:
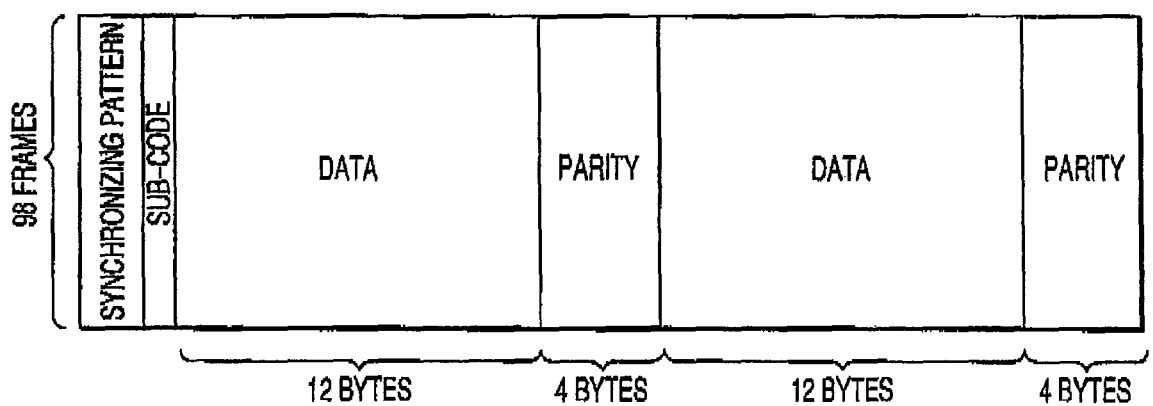
FIG. 26 is a diagram showing a definition example of disk identifying information allowing image drawing by the sub-code of the CD format.
FIG. 27 is a diagram showing the data structure of one sector of the CD format.

Similarly, in the case of what is called a hybrid CD-R disk in which the first session is already recorded and the parts after the second session can be recorded by the user, the disk identifying information of allowing the image drawing can be recorded in the main data of a read-in area or a read-out area of the first session. FIG. 27 shows a data structure of one sector of the CD format. In this data structure, data having a meaning is recorded in "data" in a program area. However, since the "data" in the read-in area or the read-out area is not read by a drive, data having no meaning such as random data or zero data is ordinarily recorded. Thus, the disk identifying information of allowing the image drawing can be recorded in the "data" of the read-in area or the read-out area. One example of the disk identifying information of allowing the image drawing that is recorded in the "data" of the read-in area or the read-out area is shown in FIG. 28. In this example, a data value is increased one by one.

(Definition Example 4 of Disk Identifying Information of Allowing Image Drawing in CD Format)

Similarly, in the case of what is called a hybrid CD-R disk in which the first session is already recorded and the parts after the second session can be recorded by the user, a specific CRC error generating pattern of the first session can be defined as the disk identifying information of allowing the image drawing. An example of the CRC error generating pattern is shown in FIG. 29. Numbers 0 to 89 designates addresses N to (N+89) of sub-code frames from an arbitrary sub-code frame N, "O" shows the sub-code frame having no CRC error. "X" shows the sub-code frame having the CRC error. In the example shown in FIG. 29, the pattern that the CRC error is generated at intervals of addresses of the multiples of 3 subsequent to the address N is defined as the disk identifying information of allowing the image drawing. Then, the sub-codes are recorded so that such a CRC error generating pattern is obtained.

(Definition Example of Disk Identifying Information of Allowing Image Drawing in DVD+R Format)

When the data recording layer A is formed by a DVD+R or a DVD+RW format, the disk identifying information of allowing the image drawing can be recorded by using the undefined code of an ADIP. FIG. 30 shows the structure of the data of the ATIP. In this data structure, when the values of "b7 to b4" of "Byte 1" are set to values except "0000", the disk identifying information of allowing the image drawing can be recorded. For instance, "b7 to b4"="1010" can be defined as the disk identifying information of allowing the image drawing. In the case of a DVD-R or a DVD-RW format using a land pre-pit, the disk identifying information of allowing the image drawing can be recorded by using the undefined code of the land pre-pit, FIG. 31 shows a judging flow of the disk that can draw the image by the optical disk device 10 when the disk identifying information of allowing the image drawing is recorded on the recording layer A. When the optical disk 12 is inserted into the optical disk device, a focus search is carried out (S80). It is judged whether or not the optical disk is a disk having two layers (S81). The judgment as to whether or not the disk includes the two layers by searching the focus is carried out depending on whether or not two focusing positions are obtained, when, for instance, a chopping wave is applied to the focus actuator to drive the objective lens 30 (FIG. 2 to FIG. 7) from a lower end position to an upper end position. When the two focusing positions are not obtained, it is judged that there is no image drawing layer B to permit the data to be recorded only on the laser incident surface 12a.

When the two focusing positions are obtained, it is judged that the image can be drawn to allow the laser beam 18 to focus on the data recording layer A (S82). Then, the spindle motor 14 is driven, the tracking servo 92 of the optical pick-up 16 is turned on (S83) and the laser beam 18 is allowed to follow the grooves C of the data recording layer A. Then, the area of the data recording layer A on which the disk identifying information of allowing the image drawing is recorded is sought (S84). The data of the area is read (S85) to judge whether or not there is the disk identifying information of allowing the image drawing (S86). When the disk identifying information of allowing the image drawing is detected, it is judged that the image can be drawn on the image drawing layer B (S87) to draw the image by waiting for an instruction for drawing the image from the user. On the other hand, when the disk identifying information of allowing the image drawing is not detected, it is judged that the image cannot be drawn on the image drawing layer B (S88) to permit the data to be recorded only on the laser incident surface 12a.

<Judging Method 2 for Disk Capable of Drawing Image>

In this method, a disk identifying mark of allowing image drawing that can be detected by the optical pick-up 18 is formed on the surface of the disk substrate of the laser incident surface 12a side of the optical disk 12 capable of drawing the image. When the optical disk is inserted into the optical disk device to (FIG. 1), it is judged whether or not the image can be drawn on the inserted optical disk depending on whether or not the disk identifying mark of allowing the image drawing can be read by the optical pick-up 16.

FIG. 32 shows an example of the form of the disk identifying mark of allowing image drawing. FIG. 32(a) shows the structure of the laser incident surface 12a side of the optical disk 12 capable of drawing the image. FIG. 32(b) shows an image drawing area of the optical disk 12. The structure of the layers of the optical disk 12 is shown in, for instance, FIGS. 2 to 7. On the surface of the disk substrate of the laser incident surface 12a side of the optical disk 12, the disk identifying mark 117 of allowing image drawing is formed by printing in black. In this example, disk identifying mark 117 of allowing image drawing is formed with four bars printed at intervals of 90° in the periphery of the center hole 12c. The width of one mark 117 (length in the direction of circumference) is about 1 mm. An area 119 (a mark forming area) in the radial direction for forming the disk identifying mark 117 of allowing image drawing is an area having a radius of 21.0 to 22.0 mm from the center of the disk. The data recording layer A exists in this area, however, the area is not recorded, nor reproduced by an ordinary optical disk device. An outer peripheral side (an outer peripheral side from the radius of 22.0 mm) of the mark forming area 119 is a data recording area 121 for recording the data. An image drawing area 123 for drawing the image on the image drawing layer B is set as an area of the outer peripheral side from a radius of 24.0 mm. The mark forming area 119 may be set to a further outer peripheral side (for instance, in the case of the DVD, an area of a radius 22.0 to 24.0 mm, and in the case of the CD, an area of a radius 23.0 to 25.0 mm).

Figure 33:
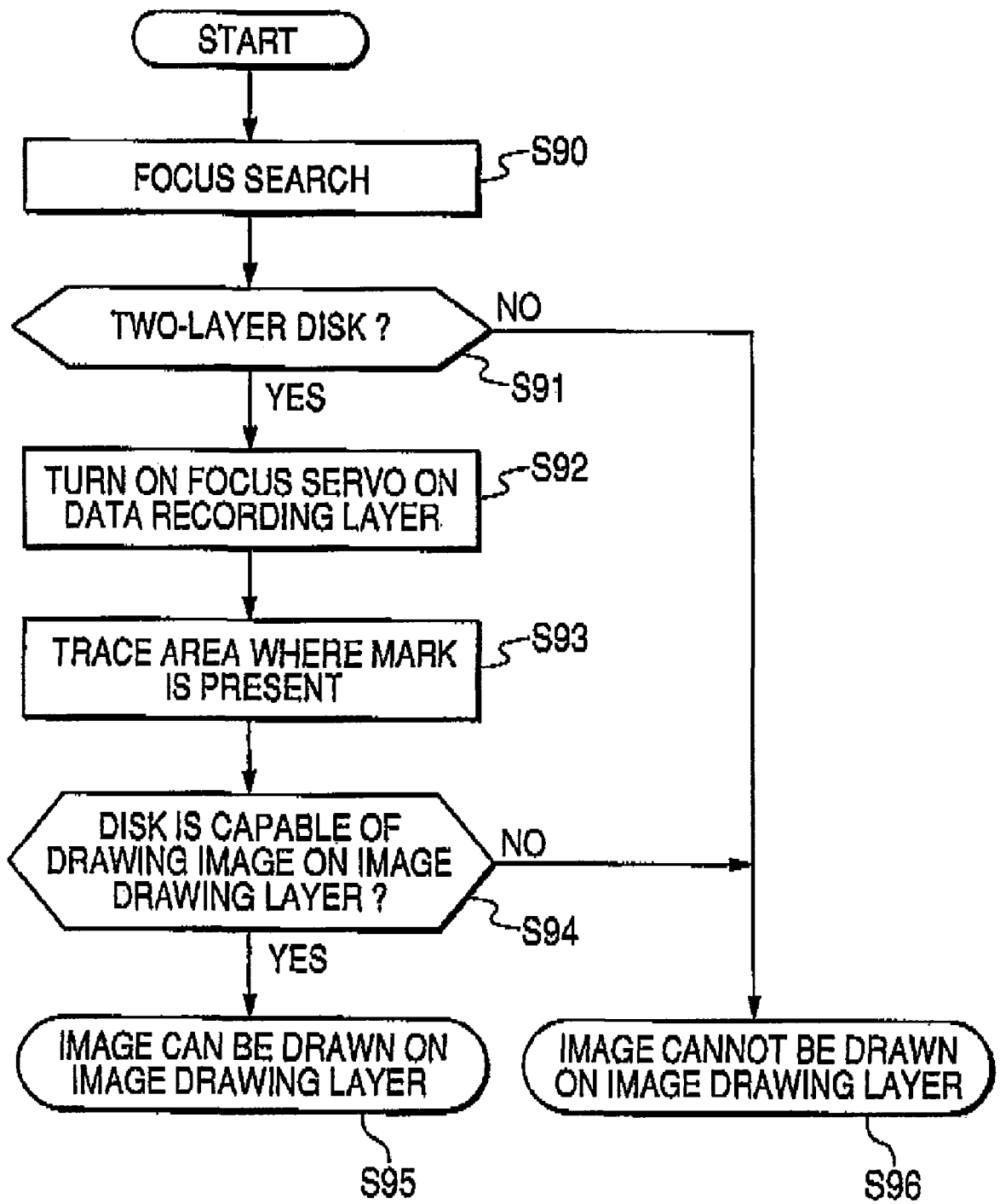
FIG. 33 is a flowchart showing a deciding method of a disk capable of drawing an image by the optical disk device 10 when the disk identifying mark 117 allowing image drawing is formed.

FIG. 33 shows a flow of judging the disk that can draw the image by the optical disk device 10 when the disk identifying mark 117 of allowing image drawing is formed as described above. When the optical disk 12 is inserted into the optical disk device, a focus search is carried out (S90). It is judged whether or not the optical disk is a disk having two layers (S91). The judgment as to whether or not the disk includes the two layers by the focus search is carried out depending on whether or not two focusing positions are obtained, when, for instance, a chopping wave is applied to the focus actuator to drive the objective lens 30 (FIG. 2 to FIG. 7) from a lower end position to an upper end position. When the two focusing positions are not obtained, it is judged that there is no image drawing layer B to permit the data to be recorded only on the laser incident surface 12a.

When the two focusing positions are obtained, it is judged that the image can be drawn to allow the laser beam 18 to focus on the data recording layer A (S92). Then, the area of the data recording layer A on which the disk identifying mark 117 of allowing image drawing is formed is traced by the laser beam 18 (S93) to judge whether or not the disk identifying mark 117 of allowing image drawing is present in accordance with a periodical increase or decrease of a quantity of reflected light (S94). When the disk identifying mark 117 of allowing image drawing is detected, it is judged that the image can be drawn on the image drawing layer B (S95) to draw the image by waiting for an instruction for drawing the image from the user. On the other hand, when the disk identifying mark 117 of allowing image drawing is not detected, it is judged that the image cannot be drawn on the image drawing layer B (S96) to permit the data to be recorded only on the laser incident surface 12a.

What is claimed is:

1. An optical disk image drawing method of forming a visible image on an optical disk that includes a data recording layer formed with a track and storing predetermined information along the track and an image drawing layer on which the visible image is to be formed and which is laminated on the data recording layer, wherein data is capable of being recorded on the data recording layer and visible image is capable of being formed on the image drawing layer by applying a laser beam from a same surface side of the optical disk, the method comprising:

rotating the optical disk by a spindle motor;

focusing a laser beam having a reproducing power outputted from an optical pick-up on the data recording layer and tracking the laser beam on the track of the data recording layer reading the predetermined information recorded on the track;

detecting a predetermined position on the track based on the read predetermined information as a reference position in the disk radial direction;

measuring a position of the optical pickup in a disk radial direction with respect to the reference position disk radial direction;

changing a focus position of the laser beam from the data recording layer to the image drawing layer after the reference position is detected;

starting forming the visible image on the image drawing layer from a predetermined relative position of the optical pickup in the disk radial direction with respect to the reference position based on the measured position of the optical pickup in the disk radial direction; and sequentially moving the optical pick-up in the disk radial direction synchronously with the rotation of the spindle motor to proceed to form the visible image after the forming operation of the visible image is started.

2. The optical disk image drawing method according to claim 1, wherein the position of the optical pick-up in the radial direction with respect to the reference position is measured based on an amount of operation of a feed motor of the optical pick-up.

3. The optical disk image drawing method according to claim 1, wherein the visible image is permitted to be formed on the image drawing layer under condition that the optical pick-up detects predetermined disk identifying information, which allows image drawing, from the data recording layer of the optical disk.

4. The optical disk image drawing method according to claim 3, wherein the disk identifying information is described by any of a sub-code, main data, a specific generation pattern of a CRC error, an ATIP, and ADIP.

5. The optical disk image drawing method according to claim 1, wherein the visible image is permitted to be formed on the image drawing layer under condition that the optical pick-up detects a disk identifying mark, which allows image drawing, formed in an area in an inner periphery side from a data recording area on a disk substrate surface at a side that the data recording layer of the optical disk is arranged or on the data recording layer.

6. The optical disk image drawing method according to claim 1, wherein the predetermined position on the track based is detected based on the read predetermined information as the reference position in the disk radial direction and in a disk rotating direction, the position of the optical pickup is measured in the disk radial direction and in the disk rotating direction with respect to the reference position, and the forming the visible image on the image drawing layer is started from a predetermined relative position of the spindle motor in the rotating direction with respect to the reference position and a predetermined relative position of the optical pickup in the disk radial direction with respect to the reference position based on the measured position of the spindle motor in the rotating direction and the measured position of the optical pickup in the disk radial direction.

* * * * *

UNITED STATES PATENT AND TRADEMARK OFFICE
CERTIFICATE OF CORRECTION

PATENT NO. : 7,760,221 B2
APPLICATION NO. : 11/768292
DATED : July 20, 2010
INVENTOR(S) : Itoga et al.

Page 1 of 1

It is certified that error appears in the above-identified patent and that said Letters Patent is hereby corrected as shown below:

Title Page, (30) Foreign Application Priority Data: should read

-- June 26, 2006                (JP) ....................2006-175860 --.

Signed and Sealed this
Eighth Day of March, 2011

David J. Kappos
*Director of the United States Patent and Trademark Office*